(12) United States Patent
Reilly et al.

(10) Patent No.: US 12,501,229 B2
(45) Date of Patent: Dec. 16, 2025

(54) MEDIA PLAYBACK BASED ON SENSOR DATA

(71) Applicant: Sonos, Inc., Santa Barbara, CA (US)

(72) Inventors: Jonathon Reilly, Cambridge, MA (US); Niels Van Erven, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/600,044

(22) Filed: Mar. 8, 2024

(65) Prior Publication Data

US 2024/0214764 A1   Jun. 27, 2024

Related U.S. Application Data

(63) Continuation of application No. 18/356,477, filed on Jul. 21, 2023, which is a continuation of application (Continued)

(51) Int. Cl.
G06F 17/00 (2019.01)
G01S 3/02 (2006.01)
(Continued)

(52) U.S. Cl.
CPC .............. *H04S 7/303* (2013.01); *G01S 3/023* (2013.01); *G01S 3/80* (2013.01); *G06F 3/165* (2013.01);
(Continued)

(58) Field of Classification Search
CPC . G01S 3/023; G01S 3/80; G06F 3/165; H04L 41/22; H04L 67/1042; H04R 3/04; H04R 27/00; H04R 29/001; H04R 29/008; H04R 2227/005; H04R 2430/01; H04S 7/301; H04S 7/302; H04S 7/303; Y02B 20/40
(Continued)

(56) References Cited

U.S. PATENT DOCUMENTS 4,885,782 A   12/1989   Eberbach
5,586,172 A   12/1996   Sakurai et al.
(Continued)

FOREIGN PATENT DOCUMENTS

CN   107465974 A   12/2017
EP   3142107 A1   3/2017
(Continued)

OTHER PUBLICATIONS 802.15 wikipedia page available 2011 (Year: 2011).*
(Continued)

*Primary Examiner* — Paul C McCord
(74) *Attorney, Agent, or Firm* — FORTEM IP LLP

(57) ABSTRACT

Example techniques relate to playback based on acoustic signals in a system including a first network device and a second network device. A first network device may detect a presence of a user using a camera and/or infrared sensors. The first network device sends, in response to detecting the presence of the user, a particular signal via the first network interface. The second network device receives data corresponding to the particular signal and plays back an audio output corresponding to the particular signal.

28 Claims, 8 Drawing Sheets

Related U.S. Application Data

No. 17/543,014, filed on Dec. 6, 2021, now Pat. No. 11,825,289, which is a continuation of application No. 17/207,640, filed on Mar. 20, 2021, now Pat. No. 11,197,117, which is a continuation of application No. 17/104,466, filed on Nov. 25, 2020, now Pat. No. 11,122,382, which is a continuation of application No. 16/658,896, filed on Oct. 21, 2019, now Pat. No. 10,945,089, which is a continuation of application No. 15/235,598, filed on Aug. 12, 2016, now Pat. No. 10,455,347, which is a continuation of application No. 15/166,241, filed on May 26, 2016, now Pat. No. 10,334,386, which is a continuation of application No. 15/056,553, filed on Feb. 29, 2016, now abandoned, which is a continuation of application No. 14/726,921, filed on Jun. 1, 2015, now Pat. No. 9,930,470, which is a continuation of application No. 13/340,126, filed on Dec. 29, 2011, now Pat. No. 9,084,058.

(51) Int. Cl.

| | | |
|---|---|---|
| *G01S 3/80* | (2006.01) | |
| *G06F 3/16* | (2006.01) | |
| *H04L 41/22* | (2022.01) | |
| *H04L 67/1042* | (2022.01) | |
| *H04R 3/04* | (2006.01) | |
| *H04R 27/00* | (2006.01) | |
| *H04R 29/00* | (2006.01) | |
| *H04S 7/00* | (2006.01) | |

(52) U.S. Cl.
CPC .......... *H04L 41/22* (2013.01); *H04L 67/1042* (2013.01); *H04R 3/04* (2013.01); *H04R 27/00* (2013.01); *H04R 29/001* (2013.01); *H04R 29/008* (2013.01); *H04S 7/302* (2013.01); *H04R 2227/005* (2013.01); *H04R 2430/01* (2013.01); *H04S 7/301* (2013.01)

(58) Field of Classification Search
USPC .............................................. 381/80; 700/94
See application file for complete search history.

(56) References Cited

U.S. PATENT DOCUMENTS

| | | |
|---|---|---|
| 5,717,768 A | 2/1998 | Laroche |
| 5,857,172 A | 1/1999 | Rozak |
| 7,571,014 B1* | 8/2009 | Lambourne ............ G06F 3/165 700/94 |
| 8,239,206 B1 | 8/2012 | LeBeau et al. |
| 8,325,909 B2 | 12/2012 | Tashev et al. |
| 8,340,975 B1 | 12/2012 | Rosenberger |
| 8,423,893 B2 | 4/2013 | Ramsay et al. |
| 8,762,156 B2 | 6/2014 | Chen |
| 8,948,426 B2 | 2/2015 | Thomasson et al. |
| 9,002,024 B2 | 4/2015 | Nakadai et al. |
| 9,047,857 B1 | 6/2015 | Barton |
| 9,088,336 B2 | 7/2015 | Mani et al. |
| 9,094,768 B2 | 7/2015 | LaBosco |
| 9,148,742 B1 | 9/2015 | Koulomzin et al. |
| 9,401,058 B2 | 7/2016 | De La Fuente et al. |
| 9,431,021 B1 | 8/2016 | Scalise et al. |
| 9,431,029 B2 | 8/2016 | Yook et al. |
| 9,456,279 B1 | 9/2016 | Murdoch |
| 9,516,444 B2 | 12/2016 | Riggi et al. |
| 9,632,748 B2 | 4/2017 | Faaborg et al. |
| 9,672,812 B1 | 6/2017 | Watanabe et al. |
| 9,691,384 B1 | 6/2017 | Wang et al. |
| 9,769,580 B2 | 9/2017 | Rabinowitz et al. |
| 9,817,549 B2 | 11/2017 | Chandrasekaran |
| 9,842,584 B1 | 12/2017 | Hart et al. |
| 9,898,250 B1 | 2/2018 | Williams et al. |
| 9,900,723 B1 | 2/2018 | Choisel et al. |
| 9,916,839 B1 | 3/2018 | Scalise et al. |
| 9,997,151 B1 | 6/2018 | Ayrapetian et al. |
| 10,002,259 B1 | 6/2018 | Mai |
| 10,028,069 B1 | 7/2018 | Lang |
| 10,074,371 B1 | 9/2018 | Wang et al. |
| 10,097,919 B2 | 10/2018 | Jarvis et al. |
| 10,152,969 B2 | 12/2018 | Reilly et al. |
| 10,200,800 B2 | 2/2019 | Thomson |
| 10,248,376 B2 | 4/2019 | Keyser-Allen et al. |
| 10,249,205 B2 | 4/2019 | Hammersley et al. |
| 10,304,440 B1 | 5/2019 | Panchapagesan et al. |
| 10,555,077 B2 | 2/2020 | Jarvis |
| 10,567,900 B2 | 2/2020 | Tanaka et al. |
| 10,586,534 B1 | 3/2020 | Argyropoulos et al. |
| 10,720,173 B2 | 7/2020 | Freeman et al. |
| 10,811,015 B2 | 10/2020 | Smith et al. |
| 10,817,249 B2 | 10/2020 | Tanaka et al. |
| 10,847,137 B1 | 11/2020 | Mandal et al. |
| 10,853,027 B2 | 12/2020 | Shih et al. |
| 10,986,460 B2 | 4/2021 | Reilly et al. |
| 11,062,705 B2 | 7/2021 | Watanabe et al. |
| 11,184,704 B2 | 11/2021 | Jarvis et al. |
| 11,184,726 B2 | 11/2021 | Hartung et al. |
| 11,197,117 B2 | 12/2021 | Reilly et al. |
| 11,295,754 B2 | 4/2022 | Eubank et al. |
| 11,540,073 B2 | 12/2022 | Oishi et al. |
| 11,696,074 B2 | 7/2023 | Woo et al. |
| 11,696,081 B2 | 7/2023 | Bush |
| 11,700,139 B2 | 7/2023 | Drake |
| 11,727,936 B2 | 8/2023 | Smith et al. |
| 11,736,877 B2 | 8/2023 | Jarvis |
| 11,803,350 B2 | 10/2023 | Sheen |
| 11,816,393 B2 | 11/2023 | Vega-Zayas et al. |
| 11,825,290 B2 | 11/2023 | Reilly et al. |
| 11,832,068 B2 | 11/2023 | Jarvis et al. |
| 11,849,299 B2 | 12/2023 | Reilly et al. |
| 11,889,276 B2 | 1/2024 | McPherson |
| 2002/0054685 A1 | 5/2002 | Avendano et al. |
| 2002/0055950 A1 | 5/2002 | Witteman |
| 2002/0169583 A1 | 11/2002 | Gutta et al. |
| 2004/0153321 A1 | 8/2004 | Chung et al. |
| 2005/0129254 A1 | 6/2005 | Connor et al. |
| 2005/0131558 A1* | 6/2005 | Braithwaite ........ H04N 21/2662 381/77 |
| 2006/0013197 A1 | 1/2006 | Anderson |
| 2006/0093998 A1 | 5/2006 | Vertegaal et al. |
| 2006/0161964 A1* | 7/2006 | Chung ..................... H04R 3/14 348/E5.002 |
| 2006/0209197 A1 | 9/2006 | Vanhatalo |
| 2006/0238877 A1 | 10/2006 | Ashkenazi et al. |
| 2007/0135061 A1 | 6/2007 | Buck et al. |
| 2008/0031475 A1 | 2/2008 | Goldstein |
| 2008/0146289 A1 | 6/2008 | Korneluk et al. |
| 2008/0147461 A1 | 6/2008 | Lee et al. |
| 2008/0160977 A1 | 7/2008 | Ahmaniemi et al. |
| 2008/0192946 A1 | 8/2008 | Faller |
| 2008/0268823 A1 | 10/2008 | Shalev et al. |
| 2008/0316863 A1 | 12/2008 | Walley |
| 2009/0013255 A1 | 1/2009 | Yuschik et al. |
| 2009/0175216 A1* | 7/2009 | Bozarth ............ H04W 72/542 370/328 |
| 2009/0175510 A1 | 7/2009 | Grim, III et al. |
| 2009/0204410 A1 | 8/2009 | Mozer et al. |
| 2009/0214048 A1 | 8/2009 | Stokes, III et al. |
| 2009/0232481 A1 | 9/2009 | Baalbergen et al. |
| 2009/0235236 A1 | 9/2009 | Nickerson et al. |
| 2009/0326949 A1 | 12/2009 | Douthitt et al. |
| 2010/0131642 A1 | 5/2010 | Chalikouras et al. |
| 2010/0136952 A1* | 6/2010 | Rofougaran ..... H04N 21/43637 455/414.1 |
| 2010/0260348 A1 | 10/2010 | Bhow et al. |
| 2010/0290643 A1 | 11/2010 | Mihelich et al. |
| 2010/0299639 A1 | 11/2010 | Ramsay et al. |
| 2010/0317332 A1 | 12/2010 | Bathiche et al. |
| 2010/0329472 A1 | 12/2010 | Nakadai et al. |
| 2011/0019833 A1 | 1/2011 | Kuech et al. |
| 2011/0044461 A1 | 2/2011 | Kuech et al. |

(56) References Cited

U.S. PATENT DOCUMENTS

| | | |
|---|---|---|
| 2011/0176687 A1 | 7/2011 | Birkenes |
| 2011/0216093 A1 | 9/2011 | Griffin |
| 2011/0286601 A1 | 11/2011 | Fukui et al. |
| 2012/0027218 A1 | 2/2012 | Every et al. |
| 2012/0076308 A1 | 3/2012 | Kuech et al. |
| 2012/0224457 A1 | 9/2012 | Kim et al. |
| 2012/0237047 A1 | 9/2012 | Neal et al. |
| 2012/0254220 A1 | 10/2012 | Verthein et al. |
| 2013/0080167 A1 | 3/2013 | Mozer |
| 2013/0080171 A1 | 3/2013 | Mozer et al. |
| 2013/0083948 A1 | 4/2013 | Schmidt |
| 2013/0129100 A1 | 5/2013 | Sorensen |
| 2013/0170363 A1 | 7/2013 | Millington et al. |
| 2013/0283169 A1 | 10/2013 | Van Wie |
| 2013/0289994 A1 | 10/2013 | Newman et al. |
| 2013/0308794 A1 | 11/2013 | Jochim et al. |
| 2013/0336499 A1 | 12/2013 | Beckhardt et al. |
| 2013/0339028 A1 | 12/2013 | Rosner et al. |
| 2014/0075308 A1 | 3/2014 | Sanders et al. |
| 2014/0093093 A1 | 4/2014 | Dusan et al. |
| 2014/0094151 A1 | 4/2014 | Klappert et al. |
| 2014/0112502 A1 | 4/2014 | Lee |
| 2014/0122075 A1 | 5/2014 | Bak et al. |
| 2014/0170979 A1 | 6/2014 | Samanta Singhar |
| 2014/0180697 A1 | 6/2014 | Torok et al. |
| 2014/0188476 A1 | 7/2014 | Li et al. |
| 2014/0244712 A1 | 8/2014 | Walters et al. |
| 2014/0270216 A1 | 9/2014 | Tsilfidis et al. |
| 2014/0270248 A1 | 9/2014 | Ivanov et al. |
| 2014/0274203 A1 | 9/2014 | Ganong, III et al. |
| 2014/0278343 A1 | 9/2014 | Tran |
| 2014/0363022 A1 | 12/2014 | Dizon et al. |
| 2015/0006176 A1 | 1/2015 | Pogue et al. |
| 2015/0018992 A1 | 1/2015 | Griffiths et al. |
| 2015/0039303 A1 | 2/2015 | Lesso et al. |
| 2015/0039310 A1 | 2/2015 | Clark et al. |
| 2015/0039311 A1 | 2/2015 | Clark et al. |
| 2015/0051723 A1 | 2/2015 | Bates et al. |
| 2015/0073807 A1 | 3/2015 | Kumar |
| 2015/0086034 A1 | 3/2015 | Lombardi et al. |
| 2015/0106085 A1 | 4/2015 | Lindahl |
| 2015/0112672 A1 | 4/2015 | Giacobello et al. |
| 2015/0124975 A1 | 5/2015 | Pontoppidan |
| 2015/0126255 A1 | 5/2015 | Yang et al. |
| 2015/0154953 A1 | 6/2015 | Bapat et al. |
| 2015/0200923 A1 | 7/2015 | Triplett |
| 2015/0215382 A1 | 7/2015 | Arora et al. |
| 2015/0222563 A1 | 8/2015 | Burns et al. |
| 2015/0350766 A1 | 12/2015 | Schobel et al. |
| 2016/0027440 A1 | 1/2016 | Gelfenbeyn et al. |
| 2016/0034448 A1 | 2/2016 | Tran |
| 2016/0066087 A1 | 3/2016 | Solbach et al. |
| 2016/0093281 A1 | 3/2016 | Kuo et al. |
| 2016/0098393 A1 | 4/2016 | Hebert |
| 2016/0098992 A1 | 4/2016 | Renard et al. |
| 2016/0118048 A1 | 4/2016 | Heide |
| 2016/0148612 A1 | 5/2016 | Guo et al. |
| 2016/0155443 A1 | 6/2016 | Khan et al. |
| 2016/0316502 A1 | 10/2016 | DeCicco |
| 2017/0070826 A1 | 3/2017 | Pedersen et al. |
| 2017/0084278 A1 | 3/2017 | Jung |
| 2017/0084292 A1 | 3/2017 | Yoo |
| 2017/0090864 A1 | 3/2017 | Jorgovanovic |
| 2017/0103754 A1 | 4/2017 | Higbie et al. |
| 2017/0110130 A1 | 4/2017 | Sharifi et al. |
| 2017/0110144 A1 | 4/2017 | Sharifi et al. |
| 2017/0236512 A1 | 8/2017 | Williams et al. |
| 2017/0242653 A1 | 8/2017 | Lang et al. |
| 2017/0242657 A1 | 8/2017 | Jarvis et al. |
| 2017/0269975 A1 | 9/2017 | Wood et al. |
| 2017/0287496 A1 | 10/2017 | Heitkamp et al. |
| 2017/0332168 A1 | 11/2017 | Moghimi et al. |
| 2017/0353789 A1 | 12/2017 | Kim et al. |
| 2017/0358313 A1 | 12/2017 | Shih |
| 2017/0365247 A1 | 12/2017 | Ushakov |
| 2018/0033428 A1 | 2/2018 | Kim et al. |
| 2018/0033429 A1 | 2/2018 | Makke et al. |
| 2018/0039530 A1 | 2/2018 | Ciabarra, Jr. et al. |
| 2018/0040324 A1 | 2/2018 | Wilberding |
| 2018/0061409 A1 | 3/2018 | Valentine et al. |
| 2018/0084367 A1 | 3/2018 | Greff et al. |
| 2018/0091898 A1 | 3/2018 | Yoon et al. |
| 2018/0096460 A1 | 4/2018 | Tripp |
| 2018/0096678 A1 | 4/2018 | Zhou et al. |
| 2018/0108351 A1 | 4/2018 | Beckhardt et al. |
| 2018/0132298 A1 | 5/2018 | Birnam et al. |
| 2018/0137857 A1 | 5/2018 | Zhou et al. |
| 2018/0165055 A1 | 6/2018 | Yu et al. |
| 2018/0167981 A1 | 6/2018 | Jonna et al. |
| 2018/0182390 A1 | 6/2018 | Hughes et al. |
| 2018/0182410 A1 | 6/2018 | Kaskari et al. |
| 2018/0197533 A1 | 7/2018 | Lyon et al. |
| 2018/0233137 A1 | 8/2018 | Torok et al. |
| 2018/0277107 A1 | 9/2018 | Kim |
| 2018/0277113 A1 | 9/2018 | Hartung et al. |
| 2018/0336892 A1 | 11/2018 | Kim et al. |
| 2018/0350356 A1 | 12/2018 | Garcia |
| 2018/0350379 A1 | 12/2018 | Wung et al. |
| 2018/0352334 A1 | 12/2018 | Family et al. |
| 2018/0358019 A1 | 12/2018 | Mont-Reynaud |
| 2018/0367944 A1 | 12/2018 | Heo et al. |
| 2019/0013019 A1 | 1/2019 | Lawrence |
| 2019/0035404 A1 | 1/2019 | Gabel et al. |
| 2019/0066710 A1 | 2/2019 | Bryan et al. |
| 2019/0073999 A1 | 3/2019 | Prémont et al. |
| 2019/0081507 A1 | 3/2019 | Ide |
| 2019/0104373 A1 | 4/2019 | Wodrich et al. |
| 2019/0122662 A1 | 4/2019 | Chang et al. |
| 2019/0156847 A1 | 5/2019 | Bryan et al. |
| 2019/0172476 A1 | 6/2019 | Wung et al. |
| 2019/0237069 A1 | 8/2019 | Zhao et al. |
| 2019/0237089 A1 | 8/2019 | Shin |
| 2019/0251960 A1 | 8/2019 | Maker et al. |
| 2019/0259408 A1 | 8/2019 | Freeman et al. |
| 2019/0287536 A1 | 9/2019 | Sharifi et al. |
| 2019/0295563 A1 | 9/2019 | Kamdar et al. |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0371324 A1 | 12/2019 | Powell et al. |
| 2019/0392832 A1 | 12/2019 | Mitsui et al. |
| 2020/0090644 A1 | 3/2020 | Klingler et al. |
| 2020/0090646 A1 | 3/2020 | Smith et al. |
| 2020/0098354 A1 | 3/2020 | Lin et al. |
| 2020/0135194 A1 | 4/2020 | Jeong |
| 2021/0287670 A1 | 9/2021 | Regan et al. |
| 2021/0295833 A1 | 9/2021 | Rastrow et al. |
| 2022/0036882 A1 | 2/2022 | Ahn et al. |
| 2022/0083136 A1 | 3/2022 | DeLeeuw |

FOREIGN PATENT DOCUMENTS

| | | |
|---|---|---|
| JP | 2003223188 A | 8/2003 |
| JP | 2004163590 A | 6/2004 |
| JP | 2006086380 A | 3/2006 |
| JP | 2008217444 A | 9/2008 |
| JP | 2016009193 A | 1/2016 |
| JP | 2016024652 A | 2/2016 |
| JP | 2016095383 A | 5/2016 |
| JP | 2016524193 A | 8/2016 |
| JP | 2016212312 A | 12/2016 |
| JP | 2018500529 A | 1/2018 |
| JP | 2020048867 A | 4/2020 |
| JP | 2022001030 A | 1/2022 |
| JP | 2022046752 A | 3/2022 |
| KR | 100966415 B1 | 6/2010 |
| KR | 20120111130 A | 10/2012 |
| KR | 20130050987 A | 5/2013 |
| KR | 20140111859 A | 9/2014 |

(56) References Cited

FOREIGN PATENT DOCUMENTS

| KR | 20160005045 A | 1/2016 |
|---|---|---|
| KR | 20160007527 A | 1/2016 |
| KR | 20160101198 A | 8/2016 |
| KR | 20160145634 A | 12/2016 |
| WO | 2016003509 A1 | 1/2016 |
| WO | 2016014686 A1 | 1/2016 |
| WO | 2016085775 A2 | 6/2016 |
| WO | 2016171956 A1 | 10/2016 |
| WO | 2016189285 A1 | 12/2016 |
| WO | 2017058654 A1 | 4/2017 |
| WO | 2017147081 A1 | 8/2017 |
| WO | 2020006410 A1 | 1/2020 |
| WO | 2020252163 A1 | 12/2020 |
| WO | 2021030334 A1 | 2/2021 |

OTHER PUBLICATIONS

Bluetooth wikipedia page available 2011 (Year: 2011).*
Advisory Action mailed on Apr. 24, 2024, issued in connection with U.S. Appl. No. 17/807,270, filed Jun. 16, 2022, 3 pages.
Canadian Patent Office, Canadian Examination Report mailed on Oct. 13, 2023, issued in connection with Canadian Application No. 3148021, 8 pages.
Canadian Patent Office, Canadian Examination Report mailed on May 17, 2024, issued in connection with Canadian Application No. 3148021, 5 pages.
European Patent Office, European EPC Article 94.3 and Rule 164(2)(b) mailed on Nov. 23, 2023, issued in connection with European Application No. 20761443.9, 15 pages.
European Patent Office, European EPC Article 94.3 mailed on Feb. 2, 2024, issued in connection with European Application No. 21171959.6, 9 pages.
European Patent Office, European EPC Article 94.3 mailed on Jan. 30, 2024, issued in connection with European Application No. 22155834.9, 4 pages.
European Patent Office, European EPC Article 94.3 mailed on Jun. 4, 2024, issued in connection with European Application No. 21180778.9, 5 pages.
European Patent Office, European Extended Search Report mailed on Apr. 15, 2024, issued in connection with European Application No. 23212793.6, 9 pages.
European Patent Office, European Search Report mailed on Oct. 17, 2023, issued in connection with European Application No. 23178432.3, 8 pages.
Final Office Action mailed on May 20, 2024, issued in connection with U.S. Appl. No. 18/308,087, filed Apr. 27, 2023, 29 pages.
Final Office Action mailed on Oct. 30, 2023, issued in connection with U.S. Appl. No. 17/458,673, filed Aug. 27, 2021, 20 pages.
Final Office Action mailed on May 8, 2024, issued in connection with U.S. Appl. No. 18/189,863, filed Mar. 24, 2023, 28 pages.
Japanese Patent Office, English Translation of Office Action mailed on Apr. 2, 2024, issued in connection with Japanese Application No. 2022-115789, 6 pages.
Non-Final Office Action mailed on Jan. 19, 2024, issued in connection with U.S. Appl. No. 18/308,087, filed Apr. 27, 2023, 22 pages.
Non-Final Office Action mailed on Feb. 2, 2024, issued in connection with U.S. Appl. No. 18/297,214, filed Apr. 7, 2023, 13 pages.
Non-Final Office Action mailed on Jun. 20, 2024, issued in connection with U.S. Appl. No. 18/007,415, filed Jan. 30, 2023, 12 pages.
Non-Final Office Action mailed on Jun. 20, 2024, issued in connection with U.S. Appl. No. 18/520,336, filed Nov. 27, 2023, 20 pages.
Non-Final Office Action mailed on Jan. 24, 2024, issued in connection with U.S. Appl. No. 18/189,863, filed Mar. 24, 2023, 28 pages.
Non-Final Office Action mailed on Oct. 25, 2023, issued in connection with U.S. Appl. No. 18/308,065, filed Apr. 27, 2023, 15 pages.
Non-Final Office Action mailed on Feb. 27, 2024, issued in connection with U.S. Appl. No. 18/343,487, filed Jun. 28, 2023, 42 pages.
Non-Final Office Action mailed on Mar. 7, 2024, issued in connection with U.S. Appl. No. 17/458,673, filed Aug. 27, 2021, 26 pages.
Non-Final Office Action mailed on Mar. 7, 2024, issued in connection with U.S. Appl. No. 18/338,841, filed Jun. 21, 2023, 15 pages.
Notice of Allowance mailed on Jan. 10, 2024, issued in connection with U.S. Appl. No. 18/069,042, filed Dec. 20, 2022, 18 pages.
Notice of Allowance mailed on Apr. 12, 2024, issued in connection with U.S. Appl. No. 18/358,710, filed Jul. 25, 2023, 9 pages.
Notice of Allowance mailed on Jan. 16, 2024, issued in connection with U.S. Appl. No. 17/810,549, filed Jul. 1, 2022, 7 pages.
Notice of Allowance mailed on Jan. 18, 2024, issued in connection with U.S. Appl. No. 18/352,394, filed Jul. 14, 2023, 7 pages.
Notice of Allowance mailed on Oct. 2, 2023, issued in connection with U.S. Appl. No. 18/189,869, filed Mar. 24, 2023, 8 pages.
Notice of Allowance mailed on Dec. 26, 2023, issued in connection with U.S. Appl. No. 18/066,077, filed Dec. 14, 2022, 6 pages.
Notice of Allowance mailed on Jun. 7, 2024, issued in connection with U.S. Appl. No. 18/316,434, filed May 12, 2023, 9 pages.
Rosenblatt, Jonathan et al. On the Optimality of Averaging in Distributed Statistical Learning. Information and Inference, Department of Computer Science and Applied Mathematics, Weizmann Institute of Science, vol. 5, No. 4, Jun. 16, 2015, 30 pages. Retrieved from the Internet: URL:https://arxiv.org/pdf/1407.2724.pdf.
Non-Final Office Action mailed on Mar. 21, 2025, issued in connection with U.S. Appl. No. 19/029,744, filed Jan. 17, 2025, 26 pages.
Non-Final Office Action mailed on Nov. 22, 2024, issued in connection with U.S. Appl. No. 18/308,065, filed Apr. 27, 2023, 15 pages.
Non-Final Office Action mailed on Feb. 26, 2025, issued in connection with U.S. Appl. No. 18/657,019, filed May 7, 2024, 27 pages.
Non-Final Office Action mailed on Nov. 26, 2024, issued in connection with U.S. Appl. No. 18/424,041, filed Jan. 26, 2024, 07 pages.
Non-Final Office Action mailed on Feb. 27, 2025, issued in connection with U.S. Appl. No. 18/487,290, filed Oct. 16, 2023, 14 pages.
Non-Final Office Action mailed on Sep. 29, 2024, issued in connection with U.S. Appl. No. 18/356,477, filed Jul. 21, 2023, 26 pages.
Non-Final Office Action mailed on Sep. 29, 2024, issued in connection with U.S. Appl. No. 18/440,111, filed Feb. 13, 2024, 25 pages.
Non-Final Office Action mailed on Jul. 30, 2024, issued in connection with U.S. Appl. No. 17/994,577, filed Nov. 28, 2022, 13 pages.
Non-Final Office Action mailed on Aug. 6, 2024, issued in connection with U.S. Appl. No. 18/313,859, filed May 8, 2023, 20 pages.
Non-Final Office Action mailed on Aug. 7, 2024, issued in connection with U.S. Appl. No. 18/502,644, filed Nov. 6, 2023, 31 pages.
Non-Final Office Action mailed on Aug. 8, 2024, issued in connection with U.S. Appl. No. 18/463,827, filed Sep. 8, 2023, 7 pages.
Non-Final Office Action mailed on Jul. 8, 2024, issued in connection with U.S. Appl. No. 18/520,531, filed Nov. 27, 2023, 63 pages.
Notice of Allowance mailed on Dec. 5, 2024, issued in connection with U.S. Appl. No. 18/463,827, filed Sep. 8, 2023, 9 pages.
Notice of Allowance mailed on Aug. 7, 2024, issued in connection with U.S. Appl. No. 18/338,841, filed Jun. 21, 2023, 05 pages.
Notice of Allowance mailed on Jul. 1, 2024, issued in connection with U.S. Appl. No. 18/511,775, filed Nov. 16, 2023, 11 pages.
Notice of Allowance mailed on Jul. 10, 2024, issued in connection with U.S. Appl. No. 18/309,939, filed May 1, 2023, 5 pages.
Notice of Allowance mailed on Oct. 11, 2024, issued in connection with U.S. Appl. No. 18/351,033, filed Jul. 12, 2023, 09 pages.
Notice of Allowance mailed on Jun. 12, 2024, issued in connection with U.S. Appl. No. 17/807,270, filed Jun. 16, 2022, 10 pages.
Notice of Allowance mailed on Sep. 12, 2024, issued in connection with U.S. Appl. No. 18/432,265, filed Feb. 5, 2024, 8 pages.
Notice of Allowance mailed on Nov. 14, 2024, issued in connection with U.S. Appl. No. 18/343,487, filed Jun. 28, 2023, 12 pages.

(56) References Cited

OTHER PUBLICATIONS

Notice of Allowance mailed on Jan. 15, 2025, issued in connection with U.S. Appl. No. 18/449,388, filed Aug. 14, 2023, 8 pages.
Notice of Allowance mailed on Jul. 17, 2024, issued in connection with U.S. Appl. No. 18/310,025, filed May 1, 2023, 7 pages.
Notice of Allowance mailed on Jun. 18, 2024, issued in connection with U.S. Appl. No. 18/297,214, filed Apr. 7, 2023, 10 pages.
Notice of Allowance mailed on Aug. 19, 2024, issued in connection with U.S. Appl. No. 18/345,588, filed Jun. 30, 2023, 20 pages.
Notice of Allowance mailed on Jul. 19, 2024, issued in connection with U.S. Appl. No. 18/328,932, filed Jun. 5, 2023, 9 pages.
Notice of Allowance mailed on Jun. 20, 2025, issued in connection with U.S. Appl. No. 18/424,041, filed Jan. 26, 2024, 8 pages.
Notice of Allowance mailed on Nov. 21, 2024, issued in connection with U.S. Appl. No. 18/323,039, filed May 24, 2023, 07 pages.
Notice of Allowance mailed on Jul. 24, 2024, issued in connection with U.S. Appl. No. 18/456,941, filed Aug. 28, 2023, 11 pages.
Notice of Allowance mailed on Jun. 24, 2024, issued in connection with U.S. Appl. No. 18/447,075, filed Aug. 9, 2023, 11 pages.
Notice of Allowance mailed on Jul. 26, 2024, issued in connection with U.S. Appl. No. 18/408,865, filed Jan. 10, 2024, 9 pages.
Notice of Allowance mailed on Aug. 28, 2024, issued in connection with U.S. Appl. No. 18/432,733, filed Feb. 5, 2024, 10 pages.
Notice of Allowance mailed on Jul. 29, 2024, issued in connection with U.S. Appl. No. 18/459,982, filed Sep. 1, 2023, 08 pages.
Notice of Allowance mailed on Jul. 3, 2024, issued in connection with U.S. Appl. No. 18/507,713, filed Nov. 13, 2023, 11 pages.
Notice of Allowance mailed on Jul. 31, 2024, issued in connection with U.S. Appl. No. 18/192,452, filed Mar. 29, 2023, 8 pages.
Notice of Allowance mailed on Jul. 31, 2024, issued in connection with U.S. Appl. No. 18/453,052, filed Aug. 21, 2023, 9 pages.
Notice of Allowance mailed on Aug. 7, 2024, issued in connection with U.S. Appl. No. 18/478,241, filed Sep. 29, 2023, 10 pages.
PaulStamatiou., "Review: Sonos ZonePlayer S5 All-In-One Wireless Music System," PaulStamatiou.com, 2009, pp. 1-11. acquired at https://web.archive.org/web/20101127024648/https://paulstamatiou.com/review-sonos-zoneplayer-s5-all-in-one-wireless-music-system.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
The Absolute Sound., "Sonos Multi-Room Music System," 2009, pp. 1-8. Review: https://www.theabsolutesound.com/articles/sonos-multi-room-music-system/.
Australian Patent Office, Australian Examination Report Action mailed on Aug. 16, 2024, issued in connection with Australian Application No. 2023248160, 2 pages.
Australian Patent Office, Australian Examination Report Action mailed on Sep. 18, 2024, issued in connection with Australian Application No. 2020218258, 3 pages.
Australian Patent Office, Australian Examination Report Action mailed on Aug. 19, 2024, issued in connection with Australian Application No. 2023237094, 2 pages.
Australian Patent Office, Australian Examination Report Action mailed on Jan. 23, 2025, issued in connection with Australian Application No. 2020329905, 3 pages.
Australian Patent Office, Australian Examination Report Action mailed on Jul. 29, 2024, issued in connection with Australian Application No. 2023237192, 3 pages.
Bohn, Dieter. The Verge. "Amazon Creates a Huge Alliance to Demand Voice Assistant Compatibility." Sep. 24, 2019, 15 pages. Retrieved from the Internet: URL: https://www.theverge.com/2019/9/24/20881321/amazon-voice-interoperability-initiative-alexa-microsoft-baidu-intel-qualcommspotify-assistants.
Canadian Patent Office, Canadian Examination Report mailed on Oct. 1, 2024, issued in connection with Canadian Application No. 3123601, 4 pages.
Canadian Patent Office, Canadian Examination Report mailed on Aug. 12, 2024, issued in connection with Canadian Application No. 3067776, 3 pages.
Canadian Patent Office, Canadian Examination Report mailed on Jun. 18, 2024, issued in connection with Canadian Application No. 3084279, 4 pages.
European Patent Office, European EPC Article 94.3 mailed on Dec. 19, 2024, issued in connection with European Application No. 22153523, 4 pages.
European Patent Office, European EPC Article 94.3 mailed on Jul. 22, 2024, issued in connection with European Application No. 23188226.7, 9 pages.
European Patent Office, European Extended Search Report mailed on Dec. 6, 2024, issued in connection with European Application No. 24174559.5, 12 pages.
European Patent Office, European Extended Search Report mailed on Feb. 24, 2025, issued in connection with European Application No. 24192454.7, 11 pages.
European Patent Office, European Extended Search Report mailed on Jul. 9, 2024, issued in connection with European Application No. 24162741.3, 12 pages.
European Patent Office, Summons to Attend Oral Proceedings mailed on Jun. 26, 2024, issued in connection with European Application No. 19740292.8, 10 pages.
European Patent Office, Summons to Attend Oral Proceedings mailed on Nov. 29, 2024, issued in connection with European Application No. 21193616.6, 9 pages.
European Patent Office, Summons to Attend Oral Proceedings mailed on Aug. 6, 2024, issued in connection with European Application No. 18789515.6, 8 pages.
Final Office Action mailed on Sep. 5, 2024, issued in connection with U.S. Appl. No. 18/343,487, filed Jun. 28, 2023, 12 pages.
Final Office Action mailed on Jun. 10, 2025, issued in connection with U.S. Appl. No. 18/308,065, filed Apr. 27, 2023, 18 pages.
Final Office Action mailed on Nov. 13, 2024, issued in connection with U.S. Appl. No. 18/487,290, filed Oct. 16, 2023, 13 pages.
Final Office Action mailed on Mar. 14, 2025, issued in connection with U.S. Appl. No. 18/440,111, filed Feb. 13, 2024, 30 pages.
Final Office Action mailed on Mar. 17, 2025, issued in connection with U.S. Appl. No. 18/356,477, filed Jul. 21, 2023, 25 pages.
Final Office Action mailed on Jul. 18, 2024, issued in connection with U.S. Appl. No. 17/450,925, filed Oct. 14, 2021, 11 pages.
Final Office Action mailed on Aug. 2, 2024, issued in connection with U.S. Appl. No. 18/048,034, filed Oct. 20, 2022, 7 pages.
Final Office Action mailed on Jul. 2, 2024, issued in connection with U.S. Appl. No. 18/308,065, filed Apr. 27, 2023, 17 pages.
Final Office Action mailed on Oct. 22, 2024, issued in connection with U.S. Appl. No. 17/458,673, filed Aug. 27, 2021, 27 pages.
Final Office Action mailed on Jan. 3, 2024, issued in connection with U.S. Appl. No. 17/807,270, filed Jun. 16, 2022, 22 pages.
Final Office Action mailed on Jul. 8, 2024, issued in connection with U.S. Appl. No. 17/222,950, filed Apr. 5, 2021, 10 pages.
International Bureau, International Preliminary Report on Patentability, mailed on Apr. 11, 2024, issued in connection with International Application No. PCT/US2022/077107, filed on Sep. 27, 2022, 9 pages.
International Bureau, International Preliminary Report on Patentability, mailed on Aug. 22, 2024, issued in connection with International Application No. PCT/US2023/062179, filed on Feb. 8, 2023, 8 pages.
International Bureau, International Preliminary Report on Patentability, mailed on Apr. 4, 2024, issued in connection with International Application No. PCT/US2022/076972, filed on Sep. 23, 2022, 14 pages.
International Bureau, International Search Report and Written Opinion mailed on Mar. 23, 2023, issued in connection with International Application No. PCT/US2022/076972, filed on Sep. 23, 2022, 20 pages.
Japanese Patent Office, Decision to Grant a Patent and Translation mailed on Dec. 10, 2024, issued in connection with Japanese Patent Application No. 2022-115789, 5 pages.
Japanese Patent Office, Notice of Reasons for Refusal and Translation mailed on Dec. 10, 2024, issued in connection with Japanese Patent Application No. 2023-149069, 8 pages.

(56) References Cited

OTHER PUBLICATIONS

Japanese Patent Office, Notice of Reasons for Refusal and Translation mailed on Dec. 17, 2024, issued in connection with Japanese Patent Application No. 2023-164165, 9 pages.

Japanese Patent Office, Notice of Reasons for Refusal and Translation mailed on Dec. 3, 2024, issued in connection with Japanese Patent Application No. 2023-144379, 12 pages.

Japanese Patent Office, Notice of Reasons for Refusal and Translation mailed on Dec. 3, 2024, issued in connection with Japanese Patent Application No. 2023-144387, 8 pages.

Japanese Patent Office, Office Action and Translation mailed on Jul. 11, 2024, issued in connection with Japanese Application No. 2022-115789, 10 pages.

Japanese Patent Office, Office Action and Translation mailed on Oct. 8, 2024, issued in connection with Japanese Patent Application No. 2023-118922, 9 pages.

Korean Patent Office, Korean Examination Report and Translation mailed on Jul. 17, 2024, issued in connection with Korean Application No. 10-2022-7024007, 10 pages.

Korean Patent Office, Korean Examination Report and Translation mailed on Aug. 5, 2024, issued in connection with Korean Application No. 10-2023-7031855, 10 pages.

Korean Patent Office, Korean Examination Report and Translation mailed on Nov. 6, 2024, issued in connection with Korean Application No. 10-2023-7032988, 13 pages.

Korean Patent Office, Korean Office Action and Translation mailed on Oct. 20, 2024, issued in connection with Korean Application No. 10-2023-7036702, 22 pages.

Non-Final Office Action mailed on Mar. 3, 2025, issued in connection with U.S. Appl. No. 18/308,087, filed Apr. 27, 2023, 25 pages.

Non-Final Office Action mailed on Jul. 11, 2024, issued in connection with U.S. Appl. No. 18/313,013, filed May 5, 2023, 18 pages.

Non-Final Office Action mailed on Feb. 12, 2025, issued in connection with U.S. Appl. No. 18/189,863, filed Mar. 24, 2023, 28 pages.

Non-Final Office Action mailed on Aug. 15, 2024, issued in connection with U.S. Appl. No. 18/323,039, filed May 24, 2023, 09 pages.

Non-Final Office Action mailed on Aug. 15, 2024, issued in connection with U.S. Appl. No. 18/487,290, filed Oct. 16, 2023, 13 pages.

Non-Final Office Action mailed on Sep. 17, 2024, issued in connection with U.S. Appl. No. 18/449,388, filed Aug. 14, 2023, 22 pages.

Non-Final Office Action mailed on Mar. 20, 2025, issued in connection with U.S. Appl. No. 19/028,592, filed Jun. 21, 2023, 33 pages.

* cited by examiner

MEDIA PLAYBACK BASED ON SENSOR DATA

CROSS REFERENCE TO RELATED APPLICATIONS

This application is a continuation of U.S. patent application Ser. No. 18/356,477, filed Jul. 21, 2023, which is a continuation of U.S. patent application Ser. No. 17/543,014. filed Dec. 6, 2021, now U.S. Pat. No. 11,825,289, which is a continuation of U.S. patent application Ser. No. 17/207, 640, filed Mar. 20, 2021, now U.S. Pat. No. 11,197,117, which is a continuation of U.S. patent application Ser. No. 17/104,466, filed Nov. 25, 2020, now U.S. U.S. Pat. No. 11,122,382, which is a continuation of U.S. patent application Ser. No. 16/658,896, Oct. 21, 2019, now U.S. Pat. No. 10,945,089, which is a continuation of U.S. patent application Ser. No. 15/235,598, filed Aug. 12, 2016, now U.S. Pat. No. 10,455,347, which is a continuation of Ser. No. 15/166, 241, filed May 26, 2016, now U.S. Pat. No. 10,334,386, which is a continuation of Ser. No. 15/056,553, filed Feb. 29, 2016, now abandoned, which is a continuation of U.S. patent application Ser. No. 14/726,921, filed Jun. 1, 2015, now U.S. Pat. No. 9,930,470, which is a continuation of U.S. patent application Ser. No. 13/340,126, filed Dec. 29, 2011, now U.S. Pat. No. 9,084,058, each of which is incorporated herein by reference in its entirety.

FIELD OF THE DISCLOSURE

The disclosure is related to consumer electronics and, more particularly, to systems, methods, and apparatus to continuously calibrate audio fields.

BACKGROUND

Home theater systems allow the listener to enjoy the cinema experience while in the comfort of their home. To deliver the best possible sound, the systems allow the listener to adjust the sound field, volume and various Digital Signal Processing (DSP) effects.

BRIEF DESCRIPTION OF THE DRAWINGS

Features, aspects, and advantages of the presently disclosed technology are better understood with regard to the following description, appended claims, and accompanying drawings where:

Figure 1:
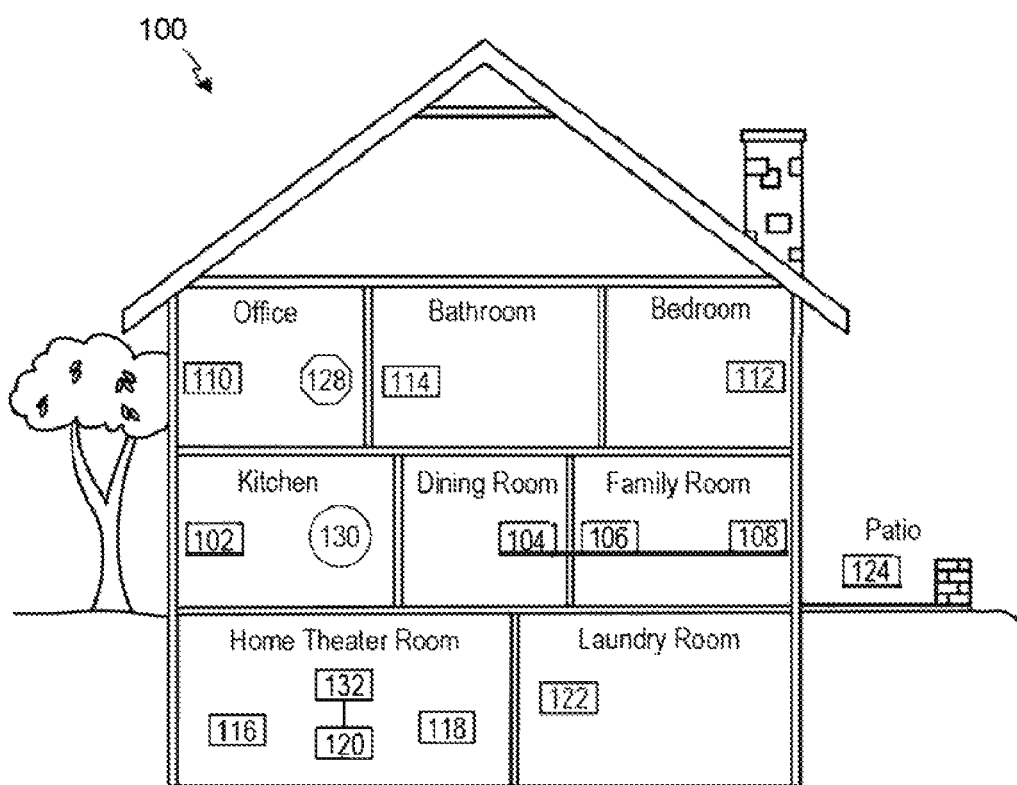
FIG. 1 shows an illustration of an example system in which embodiments of the methods and apparatus disclosed herein may be implemented.

In addition, the drawings are for the purpose of illustrating example embodiments, but it is understood the present disclosure is not limited to the arrangements and instrumentality shown in the drawings.

DETAILED DESCRIPTION

I. Overview

Example systems, methods, and apparatus to calibrate sounds fields are disclosed herein. Real-time sound calibration is achieved through localizing the position of the listener. In some examples, a location sensor such as a video camera and infrared camera detect the position of the listener and then the home theater system software adjusts the sound field. Example systems, methods, and/or apparatus disclosed herein also provide localizing the position of the listener through analyzing packets with associated timestamps. The example systems, methods, and/or apparatus disclosed herein may be used in combination with a multiple-speaker configuration in which the speakers included in the configuration share one or more sources of audio information and play the audio in synchrony.

Some example systems, methods, and/or apparatus provide first triangulating the position of the listener in the listening zone by processing data gathered by location sensors in the listening zone in real-time. Accordingly, such example systems, methods, and/or apparatus provide an audio circuit capable of generating an improved sound field adjusted for the position of the listener. This real-time listener triangulation allows for potentially increased aesthetics in the sound experienced by the listener.

An example method implemented in accordance with the disclosure includes receiving infrared signals through an infrared receiver and video data captured through a video camera at the location sensor, processing the received infrared signals and video data to triangulate the position of the listener via a triangulation algorithm, and generating, through an audio processing component, audio characteristics of a sound field modified by the position of the listener to play through a speaker.

In some embodiments, the location sensors are continuously receiving location data, wherein the continuous receiving of location data allows for tracking the position of the listener as the listener moves enabling real-time sound field calibration.

An example embodiment of apparatus implemented in accordance with the present disclosure includes depth sensors to scan the listening zone, an audio processing component to modify an audio input signal with the location information to form a sound field, first and second audio speakers having first audio characteristics, and a third audio speaker having second audio characteristics, wherein the third speaker is positioned between the first and second audio speakers. Some example apparatus include a digital audio processor to implement the first and second audio characteristics.

In some embodiments, the location sensors include infrared and image cameras which receive infrared signals and image frame data. In some embodiments, the sensors include microphones which receive acoustic wave information. In some embodiments, the acoustic wave information includes a timestamp. In some embodiments, the location sensors receive packets with an associated RSSI signal. In some embodiments, a combination of depth sensors is utilized.

In some embodiments, the apparatus further includes a network interface to receive at least one of the audio input signals, a synchronization signal associated with a multiple-device arrangement, or configuration signal associated with a multiple-device arrangement. In some such embodiments, the second speaker is to be positioned on the outside when in a multiple-device configuration.

In some embodiments, the apparatus further includes a network interface to synchronize the first and second audio output with another audio device. In some such embodiments, the network interface is to receive at least one of the audio signal or a user input.

Although the following discloses example systems, methods, and apparatus including, among other components, firmware and/or software executed on hardware, it should be noted such systems, methods, and/or apparatus are merely illustrative and should not be considered as limiting. For example, it is contemplated any or all of these firmware, hardware, and/or software components could be embodied exclusively in hardware, exclusively in software, exclusively in firmware, or in any combination of hardware, software, and/or firmware. Accordingly, while the following describes example systems, methods, and/or apparatus, the examples provided are not the only way(s) to implement such systems, methods, and/or apparatus.

When any of the appended claims are read to cover a purely software and/or firmware implementation, at least one of the elements in at least one example is hereby expressly defined to include a tangible medium such as a memory, digital versatile disk (DVD), compact disc (CD), Blu-ray, and so on, storing the software and/or firmware.

These embodiments and many additional embodiments are described more below. Further, the detailed description is presented largely in terms of illustrative environments, systems, procedures, steps, logic blocks, processing, and other symbolic representations which directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art certain embodiments of the present disclosure may be practiced without certain, specific details. In other instances, well known methods, procedures, components, and circuitry have not been described in detail to avoid unnecessarily obscuring aspects of the embodiments.

Reference herein to "embodiment" means a particular feature, structure, or characteristic described in connection with the embodiment may be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

II. Example Environment

Referring now to the drawings, in which like numerals may refer to like parts throughout the figures, FIG. 1 shows an example system configuration 100 in which one or more of the method and/or apparatus disclosed herein may be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone may cover more than one room or space. One or more of zone players 102-124 are shown in each respective zone. A zone player 102-124, also referred to as a playback device, multimedia unit, speaker, and so on, provides audio, video, and/or audiovisual output. A controller 130 (e.g., shown in the kitchen for purposes of illustration) provides control to the system configuration 100. The system configuration 100 illustrates an example whole house audio system, though it is understood the technology described herein is not limited to its particular place of application or to an expansive system like a whole house audio system 100 of FIG. 1.

Figure 2A:
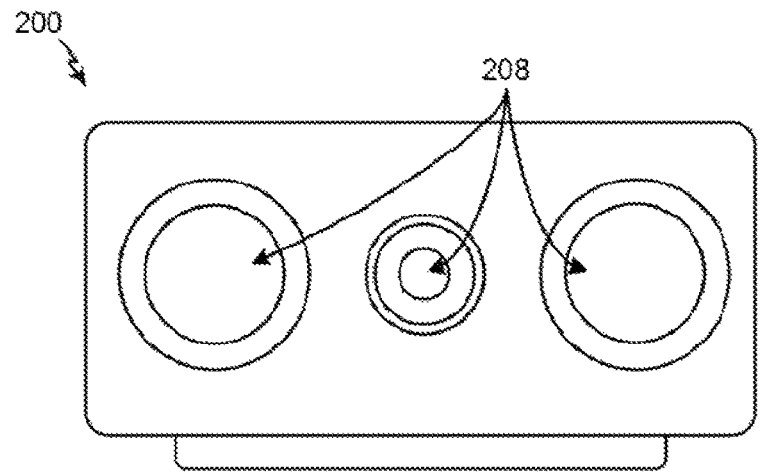
FIG. 2A shows an illustration of an example zone player having a built-in amplifier and speakers.
Figure 2B:
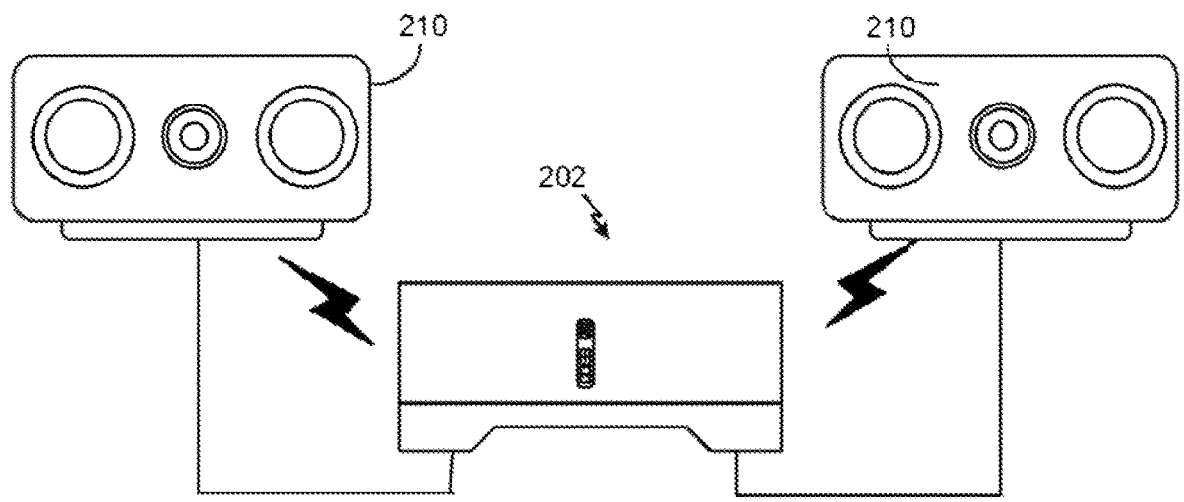
FIG. 2B shows an illustration of an example zone player having a built-in amplifier and connected to external speakers.
Figure 2C:
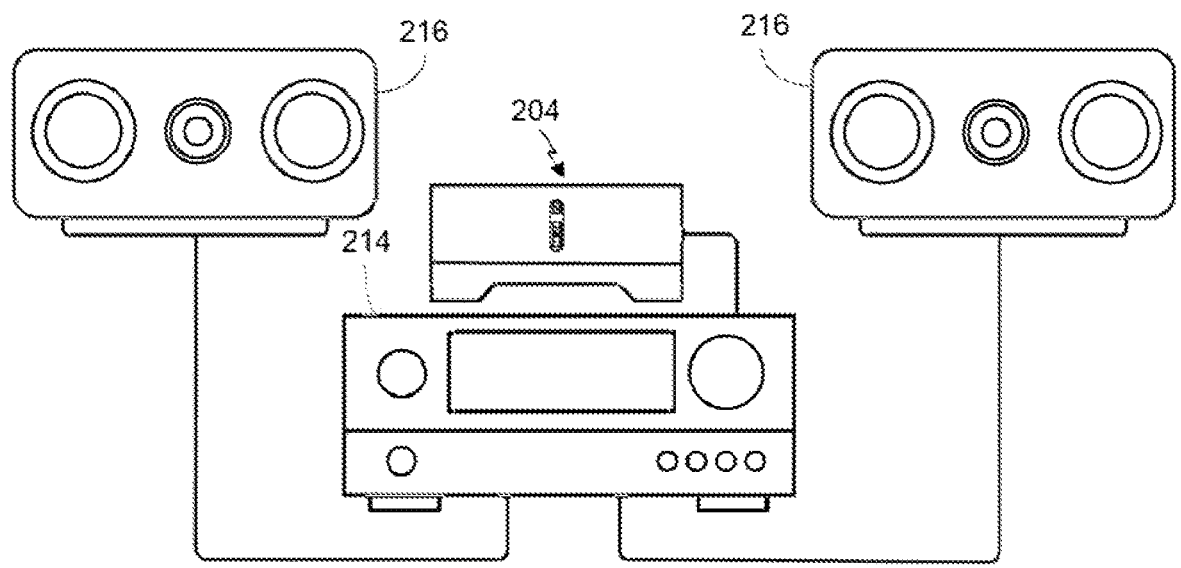
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, may correspond to any of the zone players 102-124 of FIG. 1. While certain embodiments provide multiple zone players, an audio output may be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter and two mid-range speakers). In certain embodiments, the zone player 200 of FIG. 2A may be configured to play stereophonic audio or monaural audio. In some embodiments, the zone player 200 of FIG. 2A may be configured as a component in a combination of zone players to play stereophonic audio, monaural audio, and/or surround audio. As described in greater detail below, in some embodiments, the example zone player 200 of FIG. 2A may also transmit a second signal to, for example, other zone player(s) in the same or different zone(s), speaker(s), receiver(s), and so on. Transmission of the second signal may be part of, for example, a system in which multiple zone players, speakers, receivers, and so on, form a network to, for example, present media content in a synchronization or distributed manner.

The example zone player 202 of FIG. 2B includes a built-in amplifier (not shown in this illustration) to power a set of detached speakers 210. The speakers 210 of FIG. 2B may include, for example, any type of loudspeaker. The zone player 202 of FIG. 2B may communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 may transmit a second signal, for example, to other zone player(s) in the same or different zone(s), speaker(s), receiver(s), and so on.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 may receive audio content via a wireless communication channel between the detached speakers 216 and, for example, the zone player 204 and/or the receiver 214. In some embodiments the zone player 202 may transmit a second signal to, for example, other zone player(s) in the same or different zone(s), speaker(s), receiver(s), and so on.

Example zone players include a "Sonos Play:3," "ZonePlayer® 120," and "ZonePlayer® 90," which are offered by Sonos, Inc. of Santa Barbara, California. Any other past, present, and/or future zone players may additionally or alternatively be used to implement the zone players of example embodiments disclosed herein. A zone player may also be referred to herein as a playback device, and a zone player is not limited to the particular examples illustrated in FIGS. 2A, 2B, and 2C. For example, a zone player may include a wired or wireless headphone. In other examples, a zone player might include a subwoofer. In yet other examples, a zone player may include a sound bar. In an example, a zone player may include or interact with a docking station for an Apple iPod™ or similar device. In some embodiments, a zone player may relay one or more signals received from, for example, a first zone player to another playback device. In some embodiments, a zone player may receive a first signal and generate an output corresponding to the first signal and, simultaneously or separately, may receive a second signal and transmit or relay the second signal to another zone player(s), speaker(s), receiver(s), and so on. Thus, an example zone player described herein may act as a playback device and, at the same time, operate as a hub in a network of zone players. In such instances, media content corresponding to the first signal may be different from the media content corresponding to the second signal.

Figure 3:
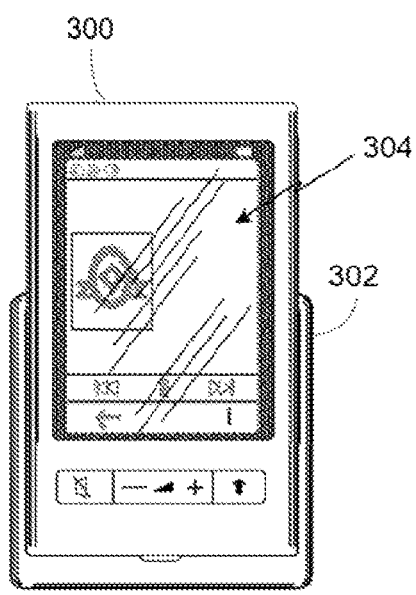
FIG. 3 shows an illustration of an example controller.

FIG. 3 shows an example illustration of a wireless controller 300 in a docking station 302. The controller 300 may correspond to the controlling device 130 of FIG. 1. The controller 300 is provided with a touch screen 304 which allows a user to interact with the controller 300, for example, to retrieve and navigate a playlist of audio items, control operations of one or more zone players, and provide overall control of the system configuration 100. In some examples, the wireless controller 300 may be used to group zone players into stereo and/or other multiple-device configurations. In certain embodiments, any number of controllers may be used to control the system configuration 100. In certain embodiments, there may be a limit on the number of controllers which may control the system configuration 100. The controllers might be wireless like wireless controller 300 or wired to the data network 128. Furthermore, an application running on any network-enabled portable device, such as an iPhone™, iPad™, Android™ powered phone, or any other smart phone or network-enabled device may be used as a controller by connecting to the data network 128. An application running on a laptop or desktop PC or Mac may also be used as a controller. Example controllers include a "Sonos® Controller 200," "Sonos® Controller for iPhone," "Sonos® Controller for iPad," "Sonos® Controller for Android, "Sonos® Controller for Mac or PC," which are offered by Sonos, Inc. of Santa Barbara, California. The flexibility of such an application and its ability to be ported to a new type of portable device is advantageous.

Referring back to the system configuration 100 of FIG. 1, a particular zone may contain one or more zone players. For example, the family room of FIG. 1 contains two zone players 106 and 108, while the kitchen is shown with one zone player 102. Zones may be dynamically configured by positioning a zone player in a room or space and assigning via the controller 130 the zone player to a new or existing zone. As such, zones may be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood such a network may be distributed in and around the system configuration 100.

Particularly, the data network 128 may be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 may further allow access to a wide area network, such as the Internet.

In certain embodiments, the data network 128 may be created by connecting any of the zone players 102-124, or some other connecting device, to a broadband router. Other zone players 102-124 may then be added wired or wirelessly to the data network 128. For example, a zone player (e.g., any of zone players 102-124) may be added to the system configuration 100 by simply pressing a button on the zone player itself, which enables a connection to be made to the data network 128. The broadband router may be connected to an Internet Service Provider (ISP), for example. The broadband router may be used to form another data network within the system configuration 100, which may be used in other applications (e.g., web surfing). The data network 128 may also be used in other applications, if so programmed. Further, in certain embodiments, the data network 128 is the same network used for other applications in the household.

In certain embodiments, each zone may play from the same audio source as another zone or each zone may play from a different audio source. For example, someone may be grilling on the patio and listening to jazz music via zone player 124, while someone is preparing food in the kitchen and listening to classical music via zone player 102. Further, someone may be in the office listening to the same jazz music via zone player 110 which is playing on the patio via zone player 124. In some embodiments, the jazz music played via zone players 110 and 124 is played in synchrony. Synchronizing playback amongst zones allows for someone to pass through zones while seamlessly listening to the audio. Further, zones may be put into a "party mode" where all associated zones will play audio in synchrony.

In certain embodiments, a zone contains two or more zone players. For example, the family room contains two zone players 106 and 108, and the home theater room contains at least zone players 116, 118, and 120. A zone may be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 may be configured to play the same audio source in synchrony, or the two zone players 106 and 108 may be paired to play two separate sounds in left and right channels, for example. In other words, the stereo effects of a sound may be reproduced or enhanced through the two zone players 106 and 108, one for the left sound and the other for the right sound. In certain embodiments, paired zone players may play audio in synchrony with other zone players.

In certain embodiments, three or more zone players may be configured to play various channels of audio which is encoded with three channels or more sound. For example, the home theater room shows zone players 116, 118, and 120, which is connected to a television 132. If the sound is encoded as 2.1 channel audio, then the zone player 116 may be configured to play left channel audio, the zone player 118 may be configured to play right channel audio, and the zone player 120 may be configured to play bass frequencies. Other configurations are possible and depend on the number of zone players and the type of audio. Further, a particular zone may be configured to play a 5.1 channel audio in one instance, such as when playing audio from a movie, and then dynamically switch to play stereo, such as when playing audio from a two channel source.

In certain embodiments, two or more zone players may be sonically consolidated to form a single, consolidated zone player. A consolidated zone player (though made up of multiple, separate devices) may be configured to process and reproduce sound differently than an unconsolidated zone player or zone players which are paired, because a consolidated zone player will have additional speaker drivers from which sound may be passed. The consolidated zone player may further be paired with a single zone player or yet another consolidated zone player. Each playback device of a consolidated playback device is preferably set in a consolidated mode.

According to some embodiments, one may continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction may be offered to the end-user.

Sources of audio content to be played by zone players 102-124 are numerous. Music from a personal library stored on a computer or networked-attached storage (NAS) may be accessed via the data network 128 and played. Internet radio stations, shows, and podcasts may be accessed via the data network 128. Music services which let a user stream and download music and audio content may be accessed via the data network 128. Further, music may be obtained from traditional sources, such as a turntable or CD player, via a line-in connection to a zone player, for example. Audio content may also be accessed through AirPlay™ wireless technology by Apple, Inc., for example. Audio content received from one or more sources may be shared amongst the zone players 102 to 124 via the data network 128 and/or the controller 130. The above-disclosed sources of audio content are referred to herein as network-based audio information sources. However, network-based audio information sources are not limited thereto.

III. Example Playback Device

Figure 4:
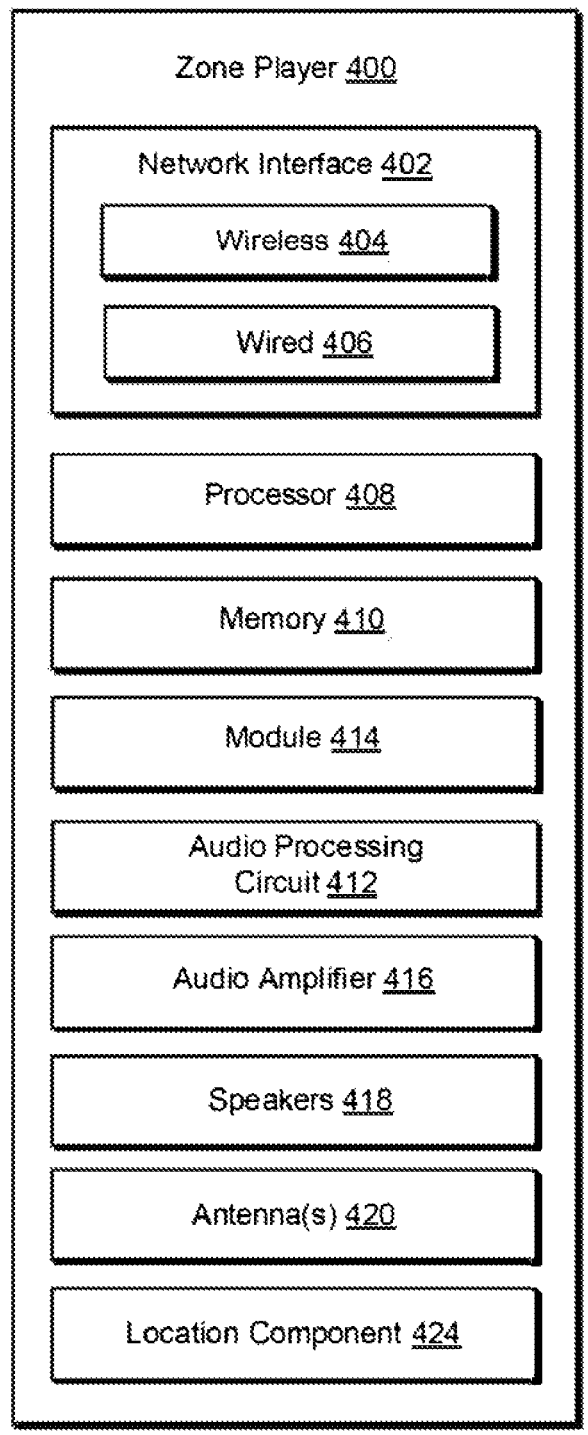
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, a speaker unit 418 coupled to the audio amplifier 416, and a location component 424. FIG. 2A shows an example illustration of such a zone player. Other types of zone players may not include the speaker unit 418 (e.g., such as shown in FIG. 2B) or the audio amplifier 416 (e.g., such as shown in FIG. 2C). In addition, other types of zone players may not include an integrated location component 424, but instead, may communicate with an external location component 424 via the network interface 402, for example. Further, it is contemplated the zone player 400 may be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 may manage the assembling of an audio source or file into smaller packets which are to be transmitted over the data network or reassembles received packets into the original source or file. In some embodiments, the network interface 402 may further handle the address part of each packet so it gets to the right destination or intercepts packets destined for the zone player 400. Accordingly, in certain embodiments, each of the packets includes an Internet Protocol (IP)-based source address as well as an IP-based destination address.

In some embodiments, the network interface 402 may include one or both of a wireless interface 404 and a wired interface 406. The wireless interface 404, also referred to as a Radio Frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device configured to process input data according to instructions stored in memory 410. The memory 410 is data storage which may be loaded with one or more software modules 414, which may be executed by the processor 408 to achieve certain tasks. In the illustrated embodiment, the memory 410 is a tangible machine readable medium storing instructions which may be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks may be achieved via the one or more software modules 414 and the processor 408.

The location component 424 may include one or more sensors, transmitters, receivers, detectors, processors, and so on. In order to determine the position of the listener or a plurality of listeners, the location circuit 424 receives location data from sensors. Based on the received location data, the location component 424 is able to generate a listener location, a number of listener locations, and/or a location point based on the number of listener locations. To gather data indicative of the position of the listener and/or listeners, the location circuit 424 communicates with the sensors. In some embodiments, a listener location is a location within a room or area. In some embodiments, a listener location is a location with a home or office space. In some embodiments, a listener location is a location relative to one or more zone players. In some embodiments, a listener location may be another predefined location.

In some embodiments, the location data is communicated to processor 408 for processing. In some embodiments, the location data is communicated to audio processing component 412 for processing. In other embodiments, the location data is processed by the location component 424. The location data may be processed by any other device or component capable of performing calculations.

In one embodiment, the location component 424 includes an image capture device such as a camera. The camera captures image frames with image characteristics. In such embodiments, the captured image frame characteristics include luminance and/or shadowing qualities. The captured image frame characteristics are then communicated to a processor for generating localization information. By comparing changes in luminance and shadowing characteristics of the captured image frames, the processor is able to detect the position of the listener to generate localization information. The generated localization information is then communicated to the audio processing circuit 412.

In another embodiment, the image capture device included in the location component 424 includes an infrared (IR) camera. In such embodiments, the IR camera captures image frame characteristics, including body heat characteristics. The captured image frame characteristics are then communicated to a processor for generating localization information. By comparing changes in body heat signatures, the processor is able to generate localization information. The generated localization information is then communicated to the audio processing component 412.

In another embodiment, an IR transmitter may be carried by the listener as a remote and/or controller (not shown). The remote may be a cellular phone, a personal digital assistant (PDA), or another portable device capable of transmitting an IR signal. The transmitted IR signals may be received by an IR receiver, such as an IR diode, included in the location component 424. These signal pulses are then gathered and communicated to the processor for generating localization data. By analyzing the phase shifts and the time delays associated with the inputted IR signals and the location of the IR receivers, the processor is able to triangulate the position of the listener. This localization information is then communicated to the audio processing circuit 412.

In another embodiment, the location component 424 includes one or more microphones. The microphones are able to gather acoustic wave information from the listener. In some embodiments, the acoustic wave information is generated by the listener. For instance, the listener may generate oratory signals which are received by the microphones included in the location component 424 as acoustic wave information. In some embodiments, the listener carries a remote, such as a cellular phone, a PDA, or another portable device, producing an auditory tone detected by the microphones included in the location component 424. The auditory tone may be in the human audible range, or may be outside of the audible range. By determining the time delay in the acoustic wave information received at the microphones, the processor is able to triangulate the position of the listener. This localization information is then communicated to the audio processing circuit 412.

In another embodiment, the listener carries a remote, such as a cellular phone, PDA, or another portable device, which transmits a control packet. Included in the control packet is an associated Received Signal Strength Indicator (RSSI) signal with a timestamp. The control packet is then received by sensors in the location component 424 of the zone player 400. The gathered control packets are then communicated to the processor. By comparing the information included in the received control packet from the listener with an associated RSSI signal and the time delay, the processor is able to triangulate the position of the listener. This localization information is then communicated to the audio processing circuit 412.

In another embodiment, the location component 424 includes sensors to receive data packets. Wireless signals, for example, transmitted at 2.4 GHz frequency, are absorbed by the human body. The data packets received by the sensors are able to detect changes in the strength of the signal received by the sensor. By comparing the expected signal strength with the actual received signal strength, the processor is able to triangulate the relative position of the listener. This localization information is then communicated to the audio processing component 412.

The audio processing component 412 may include one or more digital-to-analog converters (DAC), an audio preprocessing component, an audio enhancement component or a digital signal processor, and so on. In certain embodiments, the audio retrieved via the network interface 402 is processed and/or intentionally altered by the audio processing component 412. In some examples, the audio processing component 412 filters audio signals differently for different speakers 418. Further, the audio processing component 412 may produce analog audio signals. The processed analog audio signals are then provided to the audio amplifier 416 for play back through speakers 418. In addition, the audio processing component 412 may include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device which amplifies audio signals to a level for driving one or more speakers 418. The one or more speakers 418 may include an individual transducer (e.g., a "driver") or a complete speaker system which includes an enclosure including one or more drivers. A particular driver may be a subwoofer (for low frequencies), a mid-range driver (middle frequencies), and a tweeter (high frequencies), for example. An enclosure may be sealed or ported, for example.

A zone player 400 may also be referred to herein as a playback device. An example playback device includes a Sonos® Play:3, which is manufactured by Sonos, Inc. of Santa Barbara, California. The Play:3 is an example zone player with a built-in amplifier and speakers. In particular, the Play:3 is a three-driver speaker system which includes a tweeter and two mid-range speakers (also referred to as drivers). When playing audio content via the Play:3, the left audio data of a track is output from the left mid-range speaker, the right audio data of a track is output from the right mid-range driver, and the tweeter outputs center or both left and right audio data for a track. Audio from Internet radio stations, online music and video services, downloaded music, analog audio inputs, television, DVD, and so on, may be played from a Sonos® Play:3. While the Play:3 is an example of a zone player with speakers, it is understood a zone player with speakers is not limited to one with a certain number of speakers (e.g., three speakers as in the Play:3), but rather may contain one or more speakers. Further, a zone player may be part of another device, which might even serve a purpose different than audio (e.g., a lamp).

IV. Example Controller

Figure 5:
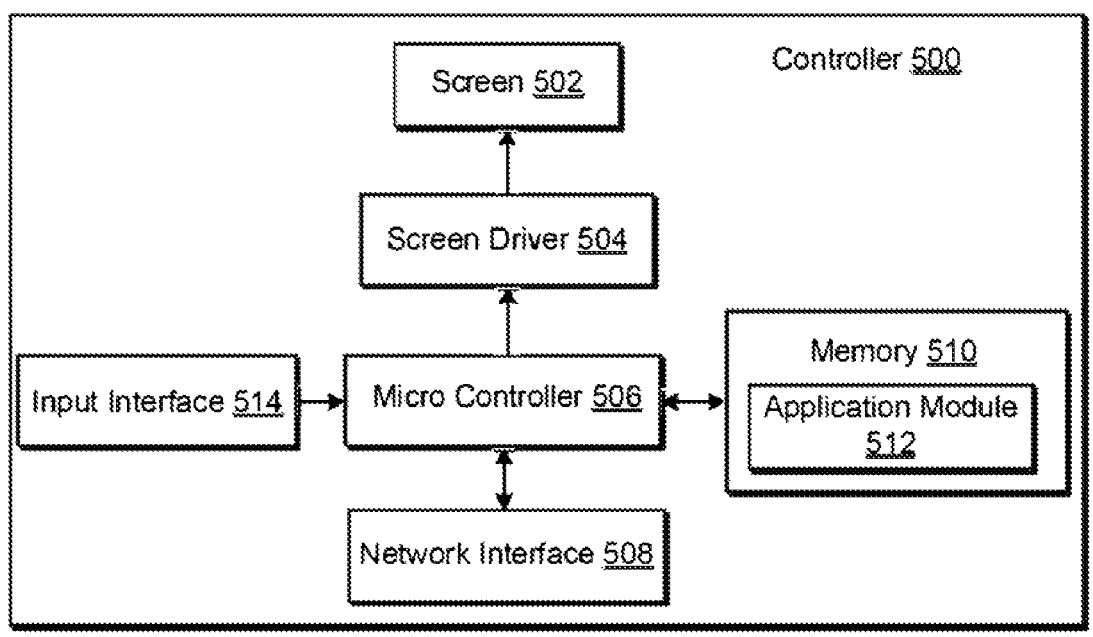
FIG. 5 shows an internal functional block diagram of an example controller.

Referring now to FIG. 5, there is shown an example controller 500, which may correspond to the controlling device 130 in FIG. 1. The controller 500 may be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source may be transmitted from a zone player or other electronic device to the controller 500 for display.

The controller 500 is provided with a screen 502 and an input interface 514 which allows a user to interact with the controller 500, for example, to navigate a playlist of many multimedia items and to control operations of one or more zone players. The screen 502 on the controller 500 may be a liquid crystal display (LCD) screen, for example. The screen 502 communicates with and is commanded by a screen driver 504 controlled by a microcontroller (e.g., a processor) 506. The memory 510 may be loaded with one or more application modules 512 which may be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 which facilitates wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 may control one or more zone players, such as 102-124 of FIG. 1. There may be more than one controller for a particular system. Further, a controller may be integrated into a zone player.

It should be noted other network-enabled devices such as an iPhone®, iPad® or any other smart phone or network-enabled device (e.g., a networked computer such as a PC or Mac®) may also be used as a controller to interact or control zone players in a particular environment. In some embodiments, a software application or upgrade may be downloaded onto a network enabled device to perform the functions described herein.

In some embodiments, a user may create a zone group including at least two zone players from the controller 500. The zone players in the zone group may play audio in a synchronized fashion, so all of the zone players in the zone group play back an identical audio source or a list of identical audio sources in a synchronized manner so no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 may group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user may manually link each zone player or room one after the other. For example, assume there is a multi-zone system which includes the following zones: Bathroom, Bedroom, Den, Dining Room, Family Room, and Foyer.

In some embodiments, a user may link any number of the six zone players, for example, by starting with a single zone and then manually linking each zone to the first zone.

In some embodiments, a set of zones may be dynamically linked together using a command to create a zone scene or theme (subsequent to first creating the zone scene). For instance, a "Morning" zone scene command may link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes may be programmed.

In some embodiments, a zone scene may be triggered based on time (e.g., an alarm clock function). For instance, a zone scene may be set to apply at 8:00 am. The system may link appropriate zones automatically, set specific music to play, and then stop the music after a defined duration. Although any particular zone may be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer may be programmed to sound. The buzzer may include a sound file stored in a zone player, for example.

Figure 6:
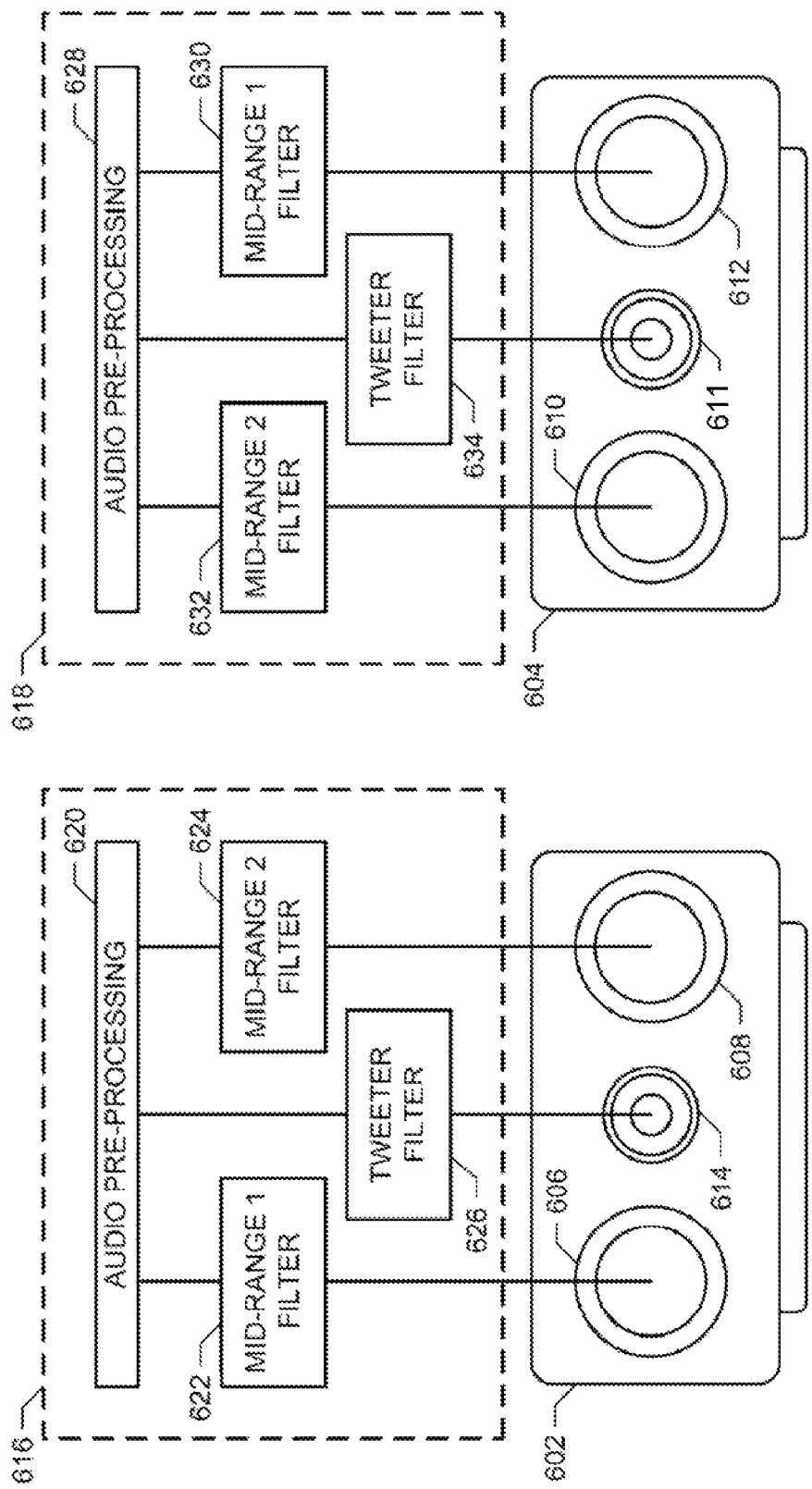
FIG. 6 shows an example pair of zone players having mid-tweeter-mid (MTM) speaker arrangements, including audio filters, and configured as a stereo pair.

FIG. 6 shows an example pair of zone players 602, 604 having mid-tweeter-mid (MTM) speaker arrangements, including audio filters, and configured as a stereo pair. Either of the example zone players 602, 604 may be implemented by the zone player 400 of FIG. 4. In particular, each of the example zone players 602, 604 includes an audio processing circuit (e.g., the audio processing circuit 412 of FIG. 4) to implement a set of audio filters, and a plurality of speakers (e.g., the speakers 418 of FIG. 4) to implement a corresponding set of speakers or audio reproduction devices.

An MTM speaker arrangement includes two mid-range speakers 606, 608, 610, 612 (e.g., speakers having a diameter between about 3.5 inches and 6.75 inches, operating in the approximate frequency range of 300-5000 Hz) and a high-range speaker, also known as a tweeter 614, 611 (e.g., 3.5 inch diameter or smaller, operating in the approximate frequency range of 2,000-20,000 Hz) per zone player 602, 604. The example zone players 602, 604 of FIG. 6 may be oriented horizontally, where the centers of the mid-range speakers are substantially level in a horizontal direction, and/or vertically, where the centers of the mid-range speakers are substantially aligned in a vertical direction. The example mid-range speakers 606, 608 are spaced so the centers of the speakers 606, 608 are approximately one-half wavelength of a selected center frequency (e.g., $\lambda_0/2$) apart. An example center frequency $\lambda_0$ which may be used to determine the spacing of the example pairs of mid-range speakers 606, 608 and 610, 612 is 1,000 Hz, which has a wavelength of about 344 millimeters (e.g., at sea level at about 20 degrees Celsius). The example tweeter 614 is positioned between the example mid-range speakers 606, 608.

The example zone players 602, 604 include respective audio filters 616, 618. As mentioned above, the example audio filters 616, 618 may be implemented using digital audio processing circuitry, such as a digital audio processor or other digital processing unit. The following example will be described with reference to the example audio filter 616 of FIG. 6. However, the description of the audio filter 616 is also applicable to the example audio filter 618. The operation of the example zone players 602, 604 as a stereo pair with respect to the audio filters 616, 618 is also discussed below. The example zone players 602, 604 may also be operated in other multiple-device arrangements. As used herein "multiple-device" refers to separate sets of speakers, such as multiple-MTM speaker arrangements, and not merely multiple speakers in the same device.

The example audio filter 616 of FIG. 6 is an active filter, which filters the received audio information prior to amplification. The example audio filter 616 includes an audio preprocessing block 620, a first mid-range filter 622, a second mid-range filter 624, and a tweeter filter 626. The example audio preprocessing block 620 may include, for example, audio decoding to decompress and/or otherwise convert an audio information (e.g., an audio file) from a storage format (e.g., compressed) to audio information in a playback format. The audio pre-processing block 620 provides the audio information to the example filters 622-626 for processing.

Some MTM speaker arrangements experience a "narrowing" phenomenon, in which a listener positioned straight in front of the speakers will experience the audio differently than a listener positioned to the left or the right of the speakers. This phenomenon is particularly acute for audio frequencies around the center frequency $f_0$ (e.g., the frequency on which the spacing of the mid-range speakers is based). In some cases, certain frequencies are completely canceled out in some positions relative to the speaker. While this behavior may be desirable in some circumstances, such as when the MTM speakers are oriented vertically (which reduces reflections and/or echoes off of the ceilings and floors), such behavior may be undesirable in others, such as when the MTM speakers are oriented horizontally (which results in a limited range of positions in which the frequency response is consistent and the audio sounds substantially as intended). Unlike such known MTM speaker arrangements, the example zone players 602, 604 of FIG. 6 reduce or eliminate the narrowing phenomenon and increase the angular audibility range (e.g., the range of angles measured from straight in front of the speaker) in which the frequency response is consistent and the sounds from the speakers are heard substantially as intended.

In the example of FIG. 6, the audio filter 616 processes the audio based on the configuration of the zone player 602 in the stereo pair. In particular, the zone player 602 is set up as the left speaker (when viewing from the front). Additionally, the zone player 602 is configured with a horizontal orientation. Thus, the zone player 602 is aware the speaker 606 is the left mid-range speaker and the speaker 608 is the right mid-range speaker for the left zone player 602 of the stereo pair (when viewing from the front). Based on this configuration information, the example audio filter 616 applies a first filtering configuration (e.g., the first mid-range filter 620) to the left (e.g., outer) mid-range speaker 606 and applies a second filtering configuration (e.g., the second mid-range filter 624) to the right (e.g., inner) mid-range speaker 608.

The example audio filter 618 also includes audio preprocessing 628, a first mid-range filter 630, a second mid-range filter 632, and a tweeter filter 634. Like the audio filter 616, the audio filter 618 applies the different filtering configurations to the example mid-range filters 610, 612 based on configuration information for the zone player 604 (e.g., physical orientation, status as right/left speaker of a stereo pair, etc.). In the example of FIG. 6, the audio filter 618 applies the first mid-range filter 630 to the right (e.g., outer) mid-range speaker 612 and applies the second mid-range filter 632 to the left (e.g., inner) mid-range speaker 610. The example audio filters 616, 618 result in the zone players 602, 604 steering audio and expanding the angular field of audibility relative to known MTM speakers.

Figure 7:
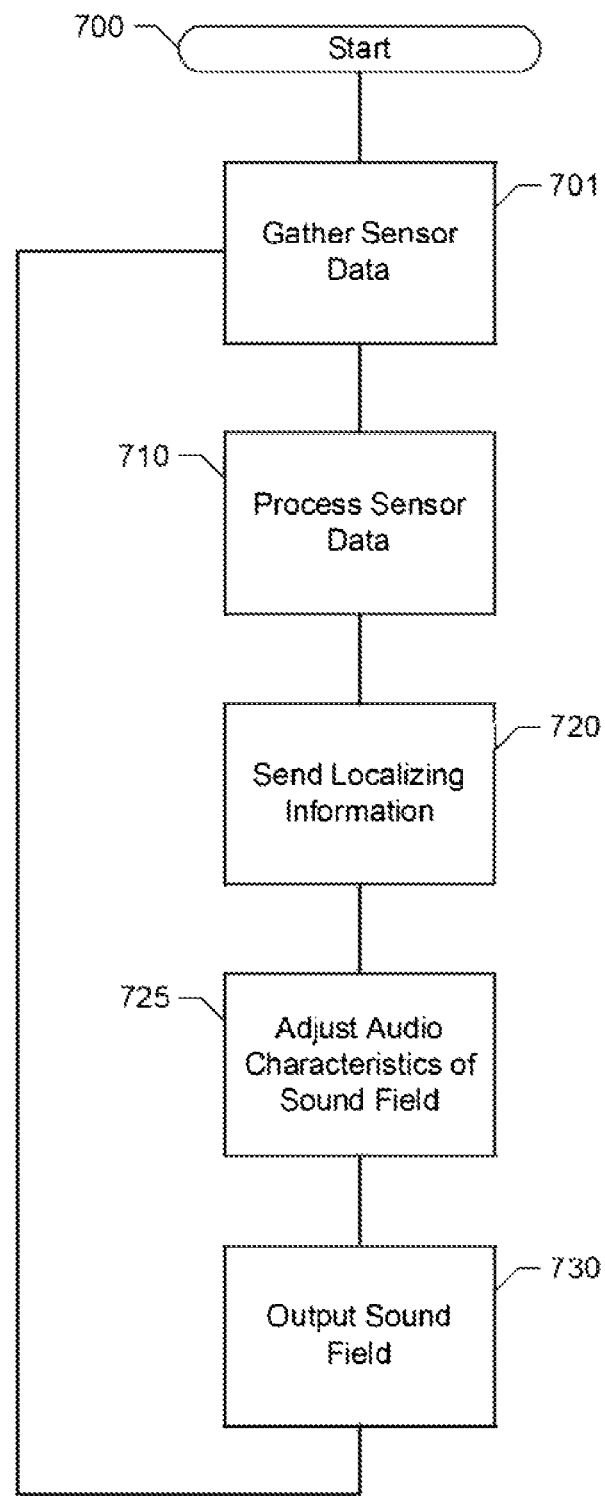
FIG. 7 is a flowchart representative of an example method to implement the example apparatus.

FIG. 7 is a flow chart describing an example method for calibrating the sound field based on the position of the listener. Operation begins when a zone player is initiated for playback (Block 700). Once initiated, the zone player begins to gather location data (Block 701). Location data is collected by the zone player through sensors included in location component 424, described above in FIG. 4.

In some embodiments, the location information captured by the sensors represents image frame characteristics. In some embodiments, the location data captured by the sensors represents body heat characteristics. In some embodiments, the location information collected by the sensors is radio frequency signals. In some embodiments, the location data collected by the sensors are data packets.

Once the location information is gathered by the location component 424, the location information is processed (Block 710). The gathered location data is processed to determine the position of the listener. In some embodiments, this processed location data defines a "sweet spot" where the sound fields received by the listener are optimized to provide the listener with the most enjoyable playback experience (e.g., optimized imaging, optimized equalization values, optimized volume levels, and so on). In some embodiments, the gathered location data determines the presence of multiple listeners in the listening zone. In some such embodiments, the processed sweet spot adjusts the audio characteristics of the retrieved audio to generate a sound field most suitable for the plurality of detected listeners. For example, in one embodiment, if two listeners were detected in a zone area, the processed sweet spot would engulf both listeners and optimize the audio characteristics of the sound field to account for the two listeners.

In some embodiments, the location data is communicated to processor 408 of FIG. 4 for processing. In some embodiments, the location data is communicated to audio processing component 412 for processing. In other embodiments, the location data is processed by the location component 424. The location data may be processed by any other device or component capable of performing calculations. Through the use of one or more triangulation algorithms and the gathered location information, the position of the listener may be calculated.

The position of the listener is then communicated to the audio processing component 412 of FIG. 4 as localization signals (Block 720). As described above with respect to FIG. 4, the audio processing component 412 may include an audio preprocessing component, an audio enhancement component or a digital signal processor, and so on. The audio retrieved by the zone player via the network interface 402 is processed and/or intentionally altered by the audio processing component 412. In some embodiments, the localization signals may be communicated to and received by a zone player in the same room as a listener or group of listeners. In some embodiments, the localization signals may be communicated to and received by a zone player or zone players with no listeners in the listening area. In some such embodiments, the localization signals may be used by the zone player or zone players to adjust the audio characteristics of the respective output sound field.

The audio processing component 412 then processes and/or intentionally alters the audio retrieved via the network interface 402 in combination with the localization signals (Block 725). In some examples, the audio processing component 412 filters the audio signals differently for different speakers. The processed audio signals output by the audio processing component 412 represent audio characteristics of a sound field adjusted for the position of the listener. In some embodiments, the audio signal may be processed based on a factory set of parameters. In some embodiments, the audio signal may be processed based on a listener set of parameters. In some embodiments, the audio signal may be processed based on a combination of factory and listener sets of parameters. For example, in one embodiment, more or less bass may be output depending on how close a listener is to a particular zone player.

In some examples, the processed audio signals also include additional listener preferences, such as volume levels. For example, in one embodiment, while a song is playing in synchrony in the Dining Room and Family Room of FIG. 1, but the listener is localized only in the Family Room, the listener preference may be to automatically lower the volume of the zone player in the Family Room and raise the volume of the zone player in the Dining Room. In some such embodiments, lowering and raising the volume in this manner may result in a more omni-directional sound field for the listener.

The processed audio signals are then provided to an audio amplifier for playback through speakers (Block 730). In some embodiments, the processed audio signals are communicated to audio amplifier 416 of FIG. 4 for playback through speakers 418 of FIG. 4. In addition, the audio processing component 412 may include necessary circuitry to play from zone player 400, send to another zone player on a network, or both play and send to another zone player on the network.

Referring back to FIG. 1, the listener localization may take place in a multiple-device configuration. For example, the Home Theater Room of FIG. 1 includes at least three zone players. As described above, if a zone or room contains more than one zone player, then the zone players may be synchronized to play the same audio source, or the zone players may be paired to play separate channels. When a zone with multiple zone players is configured, a master zone player is assigned. For instance, in one embodiment, the master zone player may be the first zone player configured in the zone. In another embodiment, the master zone player is selected by the listener. In another embodiment, the master zone player is randomly assigned.

For illustrative purposes, zone player 120 will be labeled as the master zone player. As a result, when zone players 116 and 118 are synched to the Home Theater Room zone, they are labeled as slave zone players. Once a zone player is labeled a master zone player, all slave zone players in the zone communicate information with the master zone player.

Continuing with the example, slave zone players 116 and 118 now communicate all of their information to master zone player 120. Included in the information communicated with master zone player 120 is the location data gathered by the location component 424 of each respective zone player. As a result, master zone player 120 now has the location information from each of the slave zone players 116 and 118, as well as the location information collected by the location component 424 of zone player 120. Master zone player 120 is then able to triangulate the location of the listener with all of the aggregated information. Master zone player 120 then communicates the respective localization information to each of the slave zone players 116 and 118. Each of the zone players 116-120 communicates the received localization information to the audio processing circuit 412 of each respective zone player. As a result, the audio characteristic of the output sound field of each zone player 116-120 is optimized to produce the best listening environment for the listener. For example, the volume level of the zone player or zone players nearest the position of the listener may be reduced based on the position of the listener in relation to the other zone player or zone players.

In some embodiments, the master zone player gathers the location information continuously, or near continuously, resulting in real-time, or substantially real-time, calibration of the sound field as each zone player tracks the listener throughout the listening zone. As the listener moves around in the listening zone, the sweet spot may be adjusted to track the position of the listener. In some embodiments, the master zone player gathers the location information from the slave zone players periodically. For example, the master zone player may gather the location information five times in one second. In some embodiments, the master zone player gathers the location information whenever one of the zone players in the listening zone detects a change in the position of the listener. For example, while the listener sits in a chair, all three zone players 116-120 remain idle; if zone player 116 detects movement by the listener, zone player 116 sends a signal to master zone player 120, which then gathers the location information from all of the zone players 116-120 in order to triangulate the position of the listener.

Figure 8:
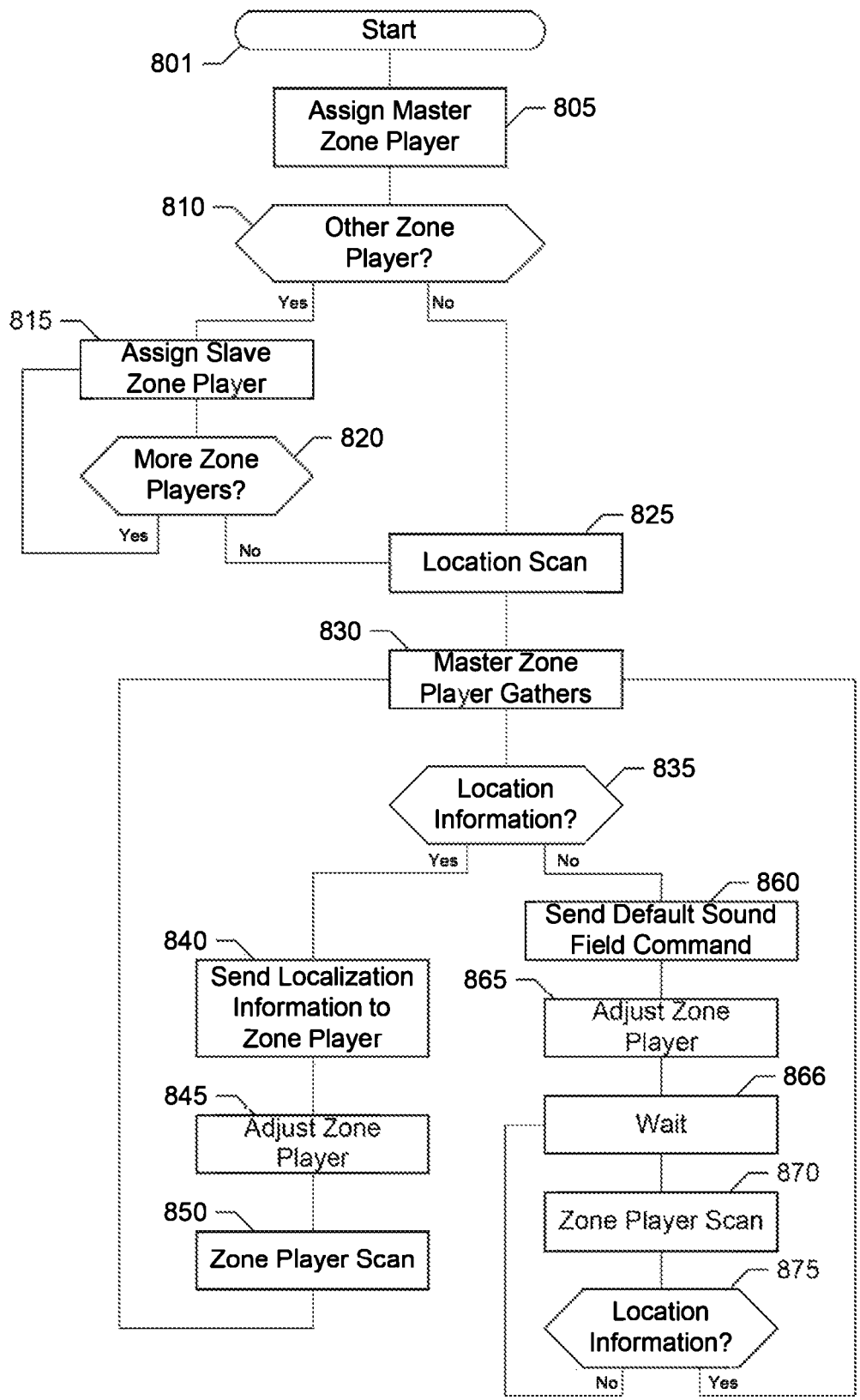
FIG. 8 is a flowchart representative of an example method to implement the example apparatus.

FIG. 8 is a flow chart describing an example method for listener localization with a multiple-device configuration in a multiple-zone scene. For example, the "Morning" zone scene described above links zone players 112, 110 and 102 in the Bedroom, Office and Kitchen zones, respectively. Operation begins when a zone scene is selected for playback (Block 801). In some embodiments, playback may be initiated through the selection of an audio song with the controller. In another embodiment, playback may be automatically initiated when a preset alarm is activated. Similar to the single-zone, multiple-device configuration, when the zone players are being linked, a master zone player is assigned (Block 805). As previously described, in some embodiments, the master zone player may be the first zone player configured in the zone. In another embodiment, the master zone player is selected by the listener. In another embodiment, the master zone player is randomly assigned.

For illustrative purposes, zone player 112 in the Bedroom zone is labeled the master zone player. If a second zone player is linked to the zone scene (Block 810), then the second zone player is labeled a slave zone player (Block 815). The method waits to see if another zone player is linked with the zone scene (Block 820), and if so, the system returns to Block 815 to label another zone player. Continuing with the example, when zone player 110 is linked with the "Morning" zone scene, it is labeled as a slave zone player (Block 815). The additional linking of zone player 102 in the Kitchen zone returns the method to Block 815, where zone player 102 is also labeled a slave zone player.

In another embodiment, no additional zone players are determined at Block 810 and the method proceeds to Block 825. In another embodiment, no additional zone players are determined at Block 820 and the method proceeds to Block 825.

Continuing with the example, while in the Bedroom, the listener selects a song to play with controller 130 of FIG. 1. As a result, master zone player 112 and slave zone players 110 and 102 begin playing the song in synchrony with each other, as described above. At Block 825, all three zone players (112, 110 and 102) perform a location scan. As described above, the location scan may be performed through a variety of sensors. In some embodiments, the sensors are cameras. In another embodiment, the sensors are IR cameras. In another embodiment, the sensors are microphones. In another embodiment, the sensors are data packet receivers.

Once each zone player has completed its location scan, the location data is communicated to the master zone player (Block 830). In the current example, master zone player 112 gathers the location information from each of the zone players linked in the "Morning" zone scene, zone players 112, 110 and 102. Master zone player 112 then processes the location information with a triangulation algorithm to determine the position of the listener with respect to each of the zone players in the zone scene. In some embodiments, the master zone player 112 communicates a status update to a user, such as through controller 300 of FIG. 3. In some such embodiments, the status update may include information regarding which zone players are active. In other such embodiments, the status update may indicate any changes to the sound field due to the position of a listener. In other such embodiments, the status update may indicate other information being monitored by the master zone player. While triangulating the position of the listener, the master zone player is able to determine there is no listener within the listening zones of zone players 110 and 102 (Block 835). Since there is a listener within the listening zone of zone player 112, localization information is communicated to the zone player (Block 840). Zone player 112 adjusts the audio characteristics of the sound field outputted from zone player 112 as described above in a single-zone, single-device configuration (Block 845). Zone player 112 then performs another location scan (Block 850) and sends the location information back to the master zone player for gathering and processing (Block 830). In some embodiments, as the listener moves around the room, the "sweet spot" is adjusted to track the position of the listener.

In another embodiment, the location information communicated to the master zone player described no listener present in the listening area (Block 835). For instance, since the listener is located in the Bedroom, the zone players in the Office zone and the Kitchen zone are unable to locate a listener. The master zone player then communicates a default sound field command along with the localization information to the zone player (Block 860). In some embodiments, the default sound field is preset by the listener. In some embodiments, the default sound field when no listener is located within the listening zone is to adjust the audio characteristics of the sound field so the volume level is decreased to a minimal level and the other audio characteristics return to a default setting as if the listener were sitting in the middle of the room. In some embodiments, the default sound field when no listener is located within the listening zone is to decrease the volume level of the speakers to the lowest setting. In some embodiments, the default sound field when no listener is located within the listening zone is to turn off the zone player so no sound field is output by the zone player. In some embodiments, the default audio setting when no listener is located within the listening zone is to make no changes to the sound field and leave the audio characteristics of the output sound field the same as they were previously set. Each zone player then adjusts the respective audio characteristics of the outputted sound field to match the default sound field command (Block 865).

The zone player then moves to Block 866, where it waits to perform the next location scan. In some embodiments, the default sound field command communicated to the zone players in Block 860 may also modify the frequency of location scans performed by the zone player. In some embodiments, since slave zone players 110 and 102 have not detected any change in their localization information, they send no location information to master zone player 112. In some embodiments, slave zone players 110 and 102 do less frequent location scans when no listener was previously detected in their respective listening zones. For instance, slave zone players 110 and 102 perform listener scans half as often as they previously were scanning. In some embodiments, slave zone players 110 and 102 perform localization scans more frequently than previously performed. For instance, slave zone players 110 and 102 perform twice as many localization scans than previously performed. In some embodiments, slave zone players 110 and 102 continue to send location information to master zone player 112 with no change in the frequency of location scans. After the waiting period is completed, the zone player then performs a new location scan (Block 870).

In some embodiments, the location scan performed in Block 870 reveals a change in the location information (Block 875) and the new location information is communicated to the master zone player in Block 830. For example, in one embodiment, zone players 110 and 102 were turned off so no sound field was output by the respective zone players at Block 865. At Block 870, zone player 110 reveals the presence of a listener in the zone player 110 listening area. Zone player 110 then resumes audio playback and communicates the new location information to the master zone player (Block 830).

In some embodiments, the location scan performed in Block 870 reveals no change in the location information (Block 875) and the method returns to Block 866 to wait to perform the next location scan.

In another embodiment, listener information communicated to the master zone player 112 in Block 830 determines the presence of a listener in the Kitchen zone as well as the Bedroom zone. In such an example, master zone player 112 and slave zone player 102 may follow the path from Block 835 to Block 840, as described above. As a result, zone players 112 and 102 output adjusted sound fields optimized for each listener. Slave zone player 110 may continue the path from Block 835 to Block 860, as described above.

In another embodiment, location scans are conducted by zone players not in the currently playing zone scene. For example, while the Morning zone scene is playing in synchrony through zone players 112, 110 and 102, zone player 114 in the Bathroom zone also performs a location scan. In some embodiments, zone player 114 detects the presence of a listener in the Bathroom zone listening area and sends the location information to the master zone player 112. Master zone player 112 may then determine if an automatic synching feature is enabled by a listener. In some embodiments, the automatic synching feature is enabled and master zone player 112 automatically adds zone player 114 to the zone scene and continues with Block 815. In some embodiments, the automatic synching feature is disabled and master zone player 112 disregards the location information provided by zone player 114.

In view of the foregoing, it should be apparent disclosed example systems, methods and apparatus may be used to provide a media playback device having improved audio quality and perception. Example systems, methods, and apparatus localize the position of the listener and then filter audio signals for outputting a sound field with audio characteristics optimized for the position of the listener.

Various inventions have been described in sufficient detail with a certain degree of particularity. It is understood to those skilled in the art the present disclosure of embodiments has been made by way of examples only and numerous changes in the arrangement and combination of parts may be resorted without departing from the spirit and scope of the present disclosure as claimed. While the embodiments discussed herein may appear to include some limitations as to the presentation of the information units, in terms of the format and arrangement, the embodiments have applicability well beyond such embodiment, which may be appreciated by those skilled in the art. Accordingly, the scope of the present disclosure is defined by the appended claims rather than the forgoing description of embodiments.

We claim:

1. A system comprising:
a first playback device comprising a display, one or more microphones, and two or more first audio transducers;
a network interface;
at least one processor; and
at least one non-transitory computer-readable medium comprising program instructions that are executable by the at least one processor such that the system is configured to:
receive media content, wherein the media content comprises video and multi-channel audio comprising five or more audio channels;
generate, from the received media content, a first portion of first audio data and a first portion of second audio data, the first portion of the first audio data and the first portion of the second audio data based on first relative positioning between a listening location, the first playback device, and a second playback device, wherein the first portion of the first audio data represents two or more first channels of the multi-channel audio and the first portion of the second audio data represents one or more second channels of the multi-channel audio;
output a first sound field, wherein the program instructions that are executable by the at least one processor such that the system is configured to output the first sound field comprise program instructions that are executable by the at least one processor such that the system is configured to:
play back the generated first portion of the first audio data via the two or more first audio transducers; and
cause, via the network interface, the second playback device to play back the generated first portion of the second audio data via one or more second audio transducers;
play back the video via the display;
receive, via the one or more microphones, microphone data indicating second relative positioning between the listening location, the first playback device, and the second playback device;
generate, from the received media content, a second portion of the first audio data and a second portion of the second audio data, the second portion of the first audio data and the second portion of the second audio data based on the second relative positioning between the listening location, the first playback device, and the second playback device, wherein the second portion of the first audio data represents two or more first channels of the multi-channel audio and the second portion of the second audio data represents one or more second channels of the multi-channel audio; and
output a second sound field, wherein the program instructions that are executable by the at least one processor such that the system is configured to output the second sound field comprise program instructions that are executable by the at least one processor such that the system is configured to:
play back the generated second portion of the first audio data via the two or more first audio transducers; and
cause, via the network interface, the second playback device to play back the generated second portion of the second audio data via the one or more second audio transducers.

2. The system of claim 1, wherein the first relative positioning comprises a first distance between the listening location and the second playback device, wherein the second relative positioning indicates a second distance between the listening location and the second playback device, and wherein the program instructions that are executable by the at least one processor such that the system is configured to generate the second portion of the first audio data and the second portion of the second audio data comprise program instructions that are executable by the at least one processor such that the system is configured to:
modify generation of the second portion of the first audio data relative to the first portion of the first audio data based on a difference between the first distance and the second distance; and
modify generation of the second portion of the second audio data relative to the first portion of the second audio data based on a difference between the first distance and the second distance.

3. The system of claim 1, wherein the first relative positioning comprises a first distance between the first playback device and the second playback device, wherein the second relative positioning indicates a second distance between the first playback device and the second playback device, and wherein the program instructions that are executable by the at least one processor such that the system is configured to generate the second portion of the first audio data and the second portion of the second audio data comprise program instructions that are executable by the at least one processor such that the system is configured to:
- modify generation of the second portion of the first audio data relative to the first portion of the first audio data based on a difference between the first distance and the second distance; and
- modify generation of the second portion of the second audio data relative to the first portion of the audio data based on a difference between the first distance and the second distance.

4. The system of claim 1, wherein the program instructions that are executable by the at least one processor such that the system is configured to generate the second portion of the first audio data and the second portion of the second audio data comprise program instructions that are executable by the at least one processor such that the system is configured to:
- modify a volume level of the second portion of the first audio data relative to the first portion of the first audio data; and
- modify a volume level of the second portion of the second audio data relative to the first portion of the first audio data.

5. The system of claim 1, wherein the program instructions that are executable by the at least one processor such that the system is configured to generate the second portion of the first audio data and the second portion of the second audio data comprise program instructions that are executable by the at least one processor such that the system is configured to:
- tune the second portion of the first audio data and the second portion of the second audio data to produce a target equalization of the second sound field at the listening location.

6. The system of claim 1, wherein the program instructions that are executable by the at least one processor such that the system is configured to generate the second portion of the first audio data and the second portion of the second audio data comprise program instructions that are executable by the at least one processor such that the system is configured to:
- adjust a sweet spot produced by the second sound field to include the listening location.

7. The system of claim 1, wherein the program instructions that are executable by the at least one processor such that the system is configured to receive the media content comprise program instructions that are executable by the at least one processor such that the system is configured to:
- receive, from a server of a streaming media service via the network interface, the media content.

8. The system of claim 1, wherein the program instructions that are executable by the at least one processor such that the system is configured to receive the media content comprise program instructions that are executable by the at least one processor such that the system is configured to:
- receive, from a video player via a media input interface, the media content.

9. The system of claim 1, wherein the program instructions that are executable by the at least one processor such that the system is configured to cause the second playback device to play back the generated second portion of the second audio data comprise program instructions that are executable by the at least one processor such that the system is configured to:
- send data representing the generated second portion of the second audio data to the second playback device via a communication protocol compatible with IEEE 802.15.

10. The system of claim 1, wherein the program instructions that are executable by the at least one processor such that the system is configured to cause the second playback device to play back the generated second portion of the second audio data comprise program instructions that are executable by the at least one processor such that the system is configured to:
- send data representing the generated second portion of the second audio data to the second playback device via a communication protocol compatible with IEEE 802.11.

11. The system of claim 1, further comprising the second playback device, wherein the at least one non-transitory computer-readable medium further comprises program instructions that are executable by the at least one processor such that the system is configured to:
- play back the generated second portion of the second audio data via the one or more second audio transducers.

12. A first playback device comprising:
a display;
one or more microphones;
two or more first audio transducers;
a network interface;
at least one processor; and
at least one non-transitory computer-readable medium comprising program instructions that are executable by the at least one processor such that the first playback device is configured to:
receive media content, wherein the media content comprises video and multi-channel audio comprising five or more audio channels;
generate, from the received media content, a first portion of first audio data and a first portion of second audio data, the first portion of the first audio data and the first portion of the second audio based on first relative positioning between a listening location, the first playback device, and a second playback device, wherein the first portion of the first audio data represents two or more first channels of the multi-channel audio and the first portion of the second audio data represents one or more second channels of the multi-channel audio;
output a first sound field, wherein the program instructions that are executable by the at least one processor such that the first playback device is configured to output the first sound field comprise program instructions that are executable by the at least one processor such that the first playback device is configured to:
  play back the generated first portion of the first audio data via the two or more first audio transducers; and
  cause, via the network interface, the second playback device to play back the generated first portion of the second audio data via one or more second audio transducers;
play back the video via the display;

receive, via the one or more microphones, microphone data indicating second relative positioning between the listening location, the first playback device, and the second playback device;

generate, from the received media content, a second portion of the first audio data and a second portion of the second audio data, the second portion of the first audio data and the second portion of the second audio data based on the second relative positioning between the listening location, the first playback device, and the second playback device, wherein the second portion of the first audio data represents two or more first channels of the multi-channel audio and the second portion of the second audio data represents one or more second channels of the multi-channel audio; and output a second sound field, wherein the program instructions that are executable by the at least one processor such that the first playback device is configured to output the second sound field comprise program instructions that are executable by the at least one processor such that the first playback device is configured to:

play back the generated second portion of the first audio data via the one or more first audio transducers; and cause, via the network interface, the second playback device to play back the generated second portion of the second audio data via the one or more second audio transducers.

13. The first playback device of claim 12, wherein the first relative positioning comprises a first distance between the listening location and the second playback device, wherein the second relative positioning indicates a second distance between the listening location and the second playback device, and wherein the program instructions that are executable by the at least one processor such that the first playback device is configured to generate the second portion of the first audio data and the second portion of the second audio data comprise program instructions that are executable by the at least one processor such that the first playback device is configured to:

modify generation of the second portion of the first audio data relative to the first portion of the first audio data based on a difference between the first distance and the second distance; and modify generation of the second portion of the second audio data relative to the first portion of the second audio data based on a difference between the first distance and the second distance.

14. The first playback device of claim 12, wherein the first relative positioning comprises a first distance between the first playback device and the second playback device, wherein the second relative positioning indicates a second distance between the first playback device and the second playback device, and wherein the program instructions that are executable by the at least one processor such that the first playback device is configured to generate the second portion of the first audio data and the second portion of the second audio data comprise program instructions that are executable by the at least one processor such that the first playback device is configured to:

modify generation of the second portion of the first audio data relative to the first portion of the first audio data based on a difference between the first distance and the second distance; and modify generation of the second portion of the second audio data relative to the first portion of the audio data based on a difference between the first distance and the second distance.

15. The first playback device of claim 12, wherein the program instructions that are executable by the at least one processor such that the first playback device is configured to generate the second portion of the first audio data and the second portion of the second audio data comprise program instructions that are executable by the at least one processor such that the first playback device is configured to:

modify a volume level of the second portion of the first audio data relative to the first portion of the first audio data; and modify a volume level of the second portion of the second audio data relative to the first portion of the first audio data.

16. The first playback device of claim 12, wherein the program instructions that are executable by the at least one processor such that the first playback device is configured to generate the second portion of the first audio data and the second portion of the second audio data comprise program instructions that are executable by the at least one processor such that the first playback device is configured to:

tune the second portion of the first audio data and the second portion of the second audio data to produce a target equalization of the second sound field at the listening location.

17. The first playback device of claim 12, wherein the program instructions that are executable by the at least one processor such that the first playback device is configured to generate the second portion of the first audio data and the second portion of the second audio data comprise program instructions that are executable by the at least one processor such that the first playback device is configured to:

adjust a sweet spot produced by the second sound field to include the listening location.

18. The first playback device of claim 12, wherein the program instructions that are executable by the at least one processor such that the first playback device is configured to receive the media content comprise program instructions that are executable by the at least one processor such that the first playback device is configured to:

receive, from a server of a streaming media service via the network interface, the media content.

19. The first playback device of claim 12, wherein the program instructions that are executable by the at least one processor such that the first playback device is configured to receive the media content comprise program instructions that are executable by the at least one processor such that the first playback device is configured to:

receive, from a video player via a media input interface, the media content.

20. The first playback device of claim 12, wherein the program instructions that are executable by the at least one processor such that the first playback device is configured to cause the second playback device to play back the generated second portion of the second audio data comprise program instructions that are executable by the at least one processor such that the first playback device is configured to:

send data representing the generated second portion of the second audio data to the second playback device via a communication protocol compatible with IEEE 802.15.

21. The first playback device of claim 12, wherein the program instructions that are executable by the at least one processor such that the first playback device is configured to cause the second playback device to play back the generated second portion of the second audio data comprise program instructions that are executable by the at least one processor such that the first playback device is configured to:
   send data representing the generated second portion of the second audio data to the second playback device via a communication protocol compatible with IEEE 802.11.

22. At least one non-transitory computer-readable medium comprising program instructions that are executable by at least one processor such that a system is configured to:
   receive media content, wherein the media content comprises video and multi-channel audio comprising five or more audio channels;
   generate, from the received media content, a first portion of first audio data and a first portion of second audio data, the first portion of the first audio data and the first portion of the second audio based on first relative positioning between a listening location, a first playback device, and a second playback device, wherein the first portion of the first audio data represents two or more first channels of the multi-channel audio and the first portion of the second audio data represents one or more second channels of the multi-channel audio;
   output a first sound field, wherein the program instructions that are executable by the at least one processor such that the system is configured to output the first sound field comprise program instructions that are executable by the at least one processor such that the system is configured to:
      play back the generated first portion of the first audio data via two or more first audio transducers, wherein the first playback device comprises the two or more first transducers and a display; and
      cause, via a network interface, the second playback device to play back the generated first portion of the second audio data via one or more second audio transducers;
   play back the video via the display;
   receive, via one or more microphones, microphone data indicating second relative positioning between the listening location, the first playback device, and the second playback device;
   generate, from the received media content, a second portion of the first audio data and a second portion of the second audio data, the second portion of the first audio data and the second portion of the second audio data based on the second relative positioning between the listening location, the first playback device, and the second playback device, wherein the second portion of the first audio data represents two or more first channels of the multi-channel audio and the second portion of the second audio data represents one or more second channels of the multi-channel audio; and
   output a second sound field, wherein the program instructions that are executable by the at least one processor such that the system is configured to output the second sound field comprise program instructions that are executable by the at least one processor such that the system is configured to:
      play back the generated second portion of the first audio data via the two or more first audio transducers; and
      cause, via the network interface, the second playback device to play back the generated second portion of the second audio data via the one or more second audio transducers.

23. The at least one non-transitory computer-readable medium of claim 22, wherein the first relative positioning comprises a first distance between the listening location and the second playback device, wherein the second relative positioning indicates a second distance between the listening location and the second playback device, and wherein the program instructions that are executable by the at least one processor such that the system is configured to generate the second portion of the first audio data and the second portion of the second audio data comprise program instructions that are executable by the at least one processor such that the system is configured to:
   modify generation of the second portion of the first audio data relative to the first portion of the first audio data based on a difference between the first distance and the second distance; and
   modify generation of the second portion of the second audio data relative to the first portion of the second audio data based on a difference between the first distance and the second distance.

24. The at least one non-transitory computer-readable medium of claim 22, wherein the first relative positioning comprises a first distance between the first playback device and the second playback device, wherein the second relative positioning indicates a second distance between the first playback device and the second playback device, and wherein the program instructions that are executable by the at least one processor such that the system is configured to generate the second portion of the first audio data and the second portion of the second audio data comprise program instructions that are executable by the at least one processor such that the system is configured to:
   modify generation of the second portion of the first audio data relative to the first portion of the first audio data based on a difference between the first distance and the second distance; and
   modify generation of the second portion of the second audio data relative to the first portion of the audio data based on a difference between the first distance and the second distance.

25. The at least one non-transitory computer-readable medium of claim 22, wherein the program instructions that are executable by the at least one processor such that the system is configured to generate the second portion of the first audio data and the second portion of the second audio data comprise program instructions that are executable by the at least one processor such that the system is configured to:
   modify a volume level of the second portion of the first audio data relative to the first portion of the first audio data; and
   modify a volume level of the second portion of the second audio data relative to the first portion of the first audio data.

26. The at least one non-transitory computer-readable medium of claim 22, wherein the program instructions that are executable by the at least one processor such that the system is configured to generate the second portion of the first audio data and the second portion of the second audio data comprise program instructions that are executable by the at least one processor such that the system is configured to:
   tune the second portion of the first audio data and the second portion of the second audio data to produce a target equalization of the second sound field at the listening location.

27. The at least one non-transitory computer-readable medium of claim 22, wherein the program instructions that are executable by the at least one processor such that the system is configured to receive the media content comprise program instructions that are executable by the at least one processor such that the system is configured to:
    receive, from a server of a streaming media service via the network interface, the media content.

28. The at least one non-transitory computer-readable medium of claim 22, wherein the program instructions that are executable by the at least one processor such that the system is configured to cause the second playback device to play back the generated second portion of the second audio data comprise program instructions that are executable by the at least one processor such that the system is configured to:
    send data representing the generated second portion of the second audio data to the second playback device via a communication protocol compatible with IEEE 802.15.

\* \* \* \* \*